(12) United States Patent
Yamada

(10) Patent No.: US 9,432,571 B2
(45) Date of Patent: Aug. 30, 2016

(54) STORAGE MEDIUM AND CONTROL DEVICE

(71) Applicant: Ryuji Yamada, Ohgaki (JP)

(72) Inventor: Ryuji Yamada, Ohgaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/185,973

(22) Filed: Feb. 21, 2014

(65) Prior Publication Data
US 2014/0232882 A1    Aug. 21, 2014

(30) Foreign Application Priority Data
Feb. 21, 2013    (JP) ................ 2013-032655

(51) Int. Cl.
*G06K 15/00*    (2006.01)
*H04N 5/232*    (2006.01)
(Continued)

(52) U.S. Cl.
CPC ...... *H04N 5/23222* (2013.01); *G03G 15/5079* (2013.01); *G06F 11/3013* (2013.01); *G06F 11/3055* (2013.01); *G06T 1/00* (2013.01);
(Continued)

(58) Field of Classification Search
CPC ............... G03G 15/5016; G03G 15/5079; G03G 15/5075; G03G 15/15; G06F 3/1234; G06F 3/121; G06F 3/1204; G06F 11/3055; G06F 11/328; G06F 11/3013; H04N 5/23222

USPC ........ 358/1.11–1.18, 1.1, 400–404, 2.1, 1.9; 709/217, 223, 224; 710/15–19; 348/207.1, 207.11, 207.2
See application file for complete search history.

(56) References Cited

U.S. PATENT DOCUMENTS

| 6,133,844 A | * | 10/2000 | Ahne ............... G06K 15/00 340/525 |
| 6,985,877 B1 | * | 1/2006 | Hayward ........ G06Q 10/06395 399/12 |

(Continued)

FOREIGN PATENT DOCUMENTS

| EP | 2469475 A1 | 6/2012 |
| JP | H02-245887 A | 10/1990 |

(Continued)

OTHER PUBLICATIONS

Aug. 20, 2014—(EP) Extended Search Report—App 14155806.4.
(Continued)

*Primary Examiner* — Chad Dickerson
(74) *Attorney, Agent, or Firm* — Banner & Witcoff, Ltd.

(57) ABSTRACT

There is provided a storage medium having a computer program stored thereon and readable by a computer for an imaging terminal including an imaging unit, the program, when executed by the computer, causing the computer to perform operations including: acquiring captured image data generated by imaging a specific region on a target product with the imaging unit, the specific region including display lamps representing a state of the target product; specifying a display state of the display lamps in a captured image by analyzing the captured image data; acquiring identification information for identifying state related information according to the specified display state of the display lamps, the state related information relating to the state of the target product corresponding to the specified display state of the display lamps; acquiring the state related information based on the identification information; and outputting the acquired state related information on the imaging terminal.

24 Claims, 13 Drawing Sheets

(51) Int. Cl.
  *G06F 11/30* (2006.01)
  *G06T 1/00* (2006.01)
  *G06F 3/12* (2006.01)
  *G03G 15/00* (2006.01)
  *G06F 11/32* (2006.01)
(52) U.S. Cl.
  CPC .... *G03G15/55* (2013.01); *G03G 2215/00109* (2013.01); *G06F 11/328* (2013.01)

(56) References Cited

U.S. PATENT DOCUMENTS

| | | | |
|---|---|---|---|
| 7,148,979 B1* | 12/2006 | Yanagawa | G06F 11/0733 358/1.14 |
| 2001/0056336 A1 | 12/2001 | Suzuki et al. | |
| 2006/0026474 A1* | 2/2006 | Honda | G03G 15/5075 714/728 |
| 2012/0259973 A1 | 10/2012 | Windell | |
| 2013/0027737 A1* | 1/2013 | Suzuki | G03G 15/5016 358/1.14 |

FOREIGN PATENT DOCUMENTS

| | | |
|---|---|---|
| JP | 2000-177216 A | 6/2000 |
| JP | 2002-067455 A | 3/2002 |
| JP | 2005-242915 A | 9/2005 |
| JP | 2007-226747 A | 9/2007 |
| JP | 2010-016563 A | 1/2010 |
| JP | 2010-165321 A | 7/2010 |

OTHER PUBLICATIONS

Mar. 1, 2016—(JP) Notification of Reasons for Refusal—App 2013-032655.

* cited by examiner

FIG. 4

| LAMP11 | LAMP12 | LAMP13 | LAMP14 | LAMP15 | STATUS | URL |
|---|---|---|---|---|---|---|
| OFF | OFF | OFF | OFF | GREEN | PRINTING POSSIBLE | — |
| OFF | YELLOW BLINKING | OFF | OFF | GREEN | TONER LOW | http://aa… |
| YELLOW BLINKING | OFF | OFF | YELLOW BLINKING | RED | PAPER JAM | http://bb… |
| OFF | OFF | YELLOW | OFF | RED | DRUM ERROR | http://cc… |
| ⋮ | ⋮ | ⋮ | ⋮ | ⋮ | ⋮ | ⋮ |

FIG. 5A

| | X COORDINATE | Y COORDINATE | WIDTH | HEIGHT |
|---|---|---|---|---|
| LAMP11 | X11 | Y11 | W11 | H11 |
| LAMP12 | X12 | Y12 | W12 | H12 |
| LAMP13 | X13 | Y13 | W13 | H13 |
| LAMP14 | X14 | Y14 | W14 | H14 |
| LAMP15 | X15 | Y15 | W15 | H15 |
| REFERENCE RANGE FOR THRESHOLD VALUE CALCULATION | X16 | Y16 | W16 | H16 |

FIG. 5B

| | YELLOW | RED | GREEN |
|---|---|---|---|
| LAMP11 | ○ | × | × |
| LAMP12 | ◎ | × | × |
| LAMP13 | ○ | × | × |
| LAMP14 | × | ◎ | × |
| LAMP15 | ◎ | ◎ | ◎ |

◎ LIGHTING, BLINKING
○ LIGHTING, NO BLINKING
× NO LIGHTING, NO BLINKING

FIG. 6

| | IMAGING TIMES | IMAGING INTERVAL /DTC |
|---|---|---|
| MODEL A | 2 | 1.0sec |
| MODEL B | 1 | – |
| MODEL C | 2 | 2.0sec |
| ⋮ | ⋮ | ⋮ |

FIG. 7

DTD, DTDa, DTDb, DTDc

| | X COORDINATE | Y COORDINATE | WIDTH | HEIGHT |
|---|---|---|---|---|
| POINT P1 | X21 | Y21 | – | – |
| POINT P2 | X22 | Y22 | – | – |
| ⋮ | ⋮ | ⋮ | ⋮ | ⋮ |
| CHARACTER REGION S1 | X31 | Y31 | W31 | H31 |
| CHARACTER REGION S2 | X32 | Y32 | W32 | H32 |
| ⋮ | ⋮ | ⋮ | ⋮ | ⋮ |

MODEL SELECTION IMAGE

MAIN IMAGE

IMAGE FOR IMAGING

MAIN IMAGE (AFTER RECOGNITION)

CAPTURED IMAGE

EDGE IMAGE

EDGE IMAGE (AFTER ROTATION)

EDGE IMAGE (AFTER ENLARGEMENT)

EDGE IMAGE (AFTER DEVIATION CORRECTION)

CAPTURED IMAGE (AFTER CORRECTION)

FIRST BLINKING: BLINKING INTERVAL = LT1
SECOND BLINKING: BLINKING INTERVAL = LT2
LT1>LT2

IMAGING INTERVAL = LT2
IMAGING TIMES = 3

○: LIGHT EMISSION
×: NO LIGHT EMISSION

| IMAGE A | IMAGE B | IMAGE C | DISPLAY STATE |
|---------|---------|---------|----------------|
| ○ | ○ | ○ | IGHTING |
| ○ | ○ | × | FIRST BLINKING |
| × | ○ | ○ | FIRST BLINKING |
| × | × | ○ | FIRST BLINKING |
| ○ | × | × | FIRST BLINKING |
| × | ○ | × | SECOND BLINKING |
| ○ | × | ○ | SECOND BLINKING |
| × | × | × | OFF |

STORAGE MEDIUM AND CONTROL DEVICE

CROSS-REFERENCE TO RELATED APPLICATION

This application claims priority from Japanese Patent Application No. 2013-032655, filed on Feb. 21, 2013, the entire subject matter of which is incorporated herein by reference.

TECHNICAL FIELD

Aspects of the present invention relate to a technique using a captured image, and more particularly, to a technique which provides information relating to a product to a user by using a captured image.

BACKGROUND

There has been known a technique which detects a state of display lamps provided in a product by using a captured image. For example, JP-A-2005-242915 discloses a technique where a monitoring device, which is attached to a rack of a server computer (a target product), detects by a monitoring camera a lighting state of an alarm LED which is provided in the server computer and indicates an abnormality. The monitoring device transmits information representing warning details according to the detected lighting state to a management computer.

However, in the above-described technique, since the warning details are transmitted to the management computer, it is not possible to allow a user to recognize specific information relating to the display state of the display lamps by outputting the specific information on an imaging terminal.

SUMMARY

Accordingly, an aspect of the present invention provides a technique to allow a user to recognize information relating to a state of a product represented by a display state of one or more display lamps provided in the product by an imaging terminal.

According to an illustrative embodiment of the present invention, there is provided a non-transitory computer-readable storage medium having a computer program stored thereon and readable by a computer for an imaging terminal including an imaging unit, the computer program, when executed by the computer, causing the computer to perform operations comprising: acquiring captured image data generated by imaging a specific region on a target product, wherein the image data is captured by the imaging unit, and wherein the specific region includes one or more display lamps representing a state of the target product; specifying a display state of the one or more display lamps in a captured image represented by the captured image data, by analyzing the captured image data; acquiring identification information for identifying state related information according to the specified display state of the one or more display lamps, wherein the state related information is information relating to the state of the target product corresponding to the specified display state of the one or more display lamps; acquiring the state related information based on the acquired identification information; and outputting the acquired state related information on the imaging terminal.

According to this configuration, the captured image data generated by imaging the specific region including the display lamps is analyzed, whereby it is possible to output the state related information according to the display state of the display lamps in the captured image by the imaging terminal. As a result, it is possible to allow the user to recognize the state related information relating to the state of the display lamps by the imaging terminal.

The present invention can be realized in various forms, and for example, can be realized in the form of a control device for controlling an imaging terminal including an imaging unit, a method of controlling an imaging terminal including an imaging unit, a computer program for realizing the functions of the terminal or the method, a recording medium having the computer program recorded thereon, or the like.

BRIEF DESCRIPTION OF THE DRAWINGS

The above and other aspects of the present invention will become more apparent and more readily appreciated from the following description of illustrative embodiments of the present invention taken in conjunction with the attached drawings, in which:

FIG. 4 is a diagram showing an example of a URL table DT1;

FIGS. 5A and 5B are diagrams showing an example of a lamp information table;

FIG. 6 is a diagram showing an example of an imaging information table DTC;

FIG. 7 is a diagram showing an example of a feature point information table DTD;

DETAILED DESCRIPTION

A. First Illustrative Embodiment

A-1. System Configuration

Figure 1:
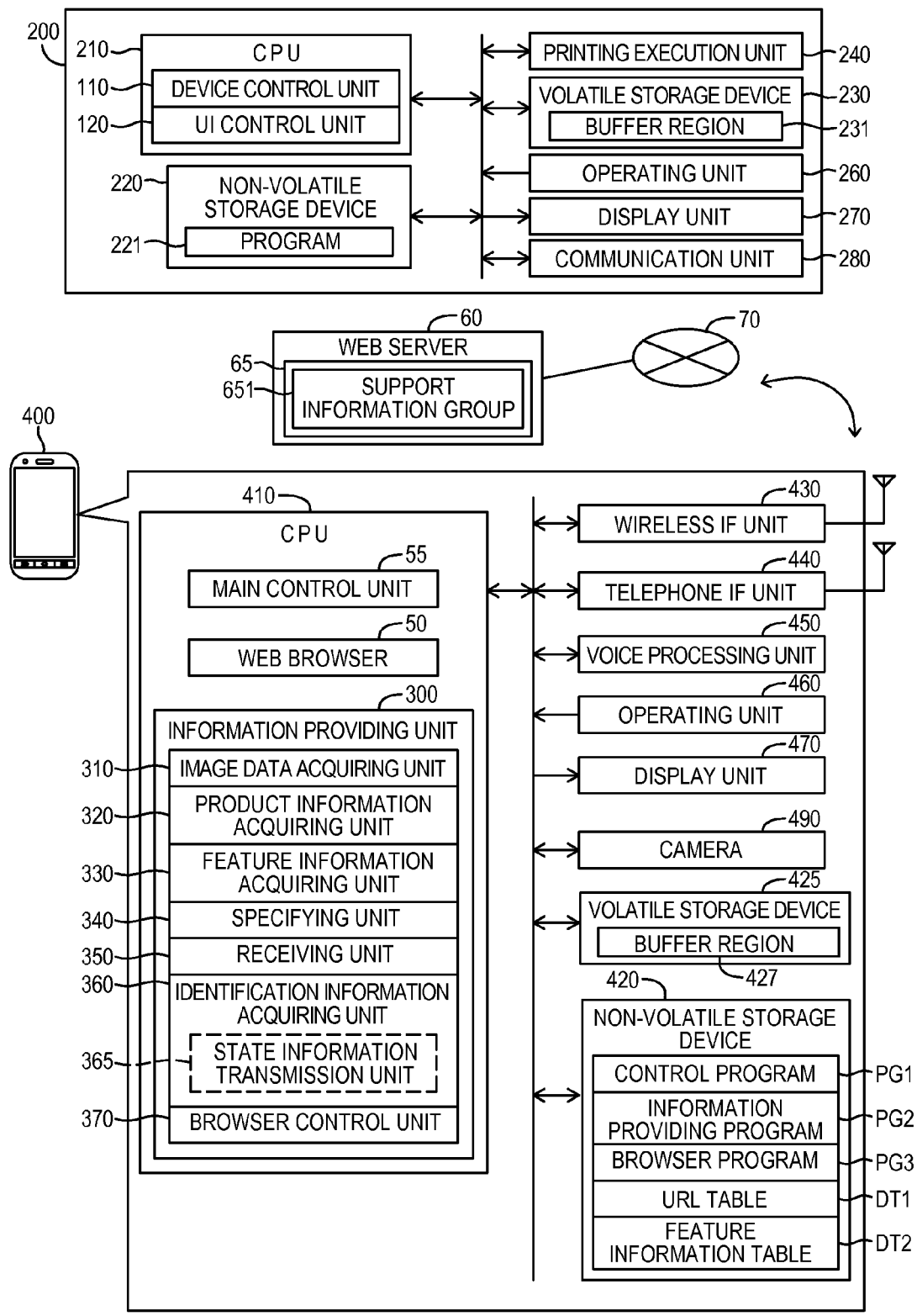
FIG. 1 is a block diagram showing a configuration of an information providing system according to a first illustrative embodiment.

An illustrative embodiment of the present invention will be described with reference to the accompanying drawings. FIG. 1 is a block diagram showing a configuration of an information providing system according to a first illustrative embodiment. This system includes a printer 200, a server 60 connected to Internet 70, and a portable terminal 400.

The printer 200 includes a CPU 210, a non-volatile storage device 220, such as a hard disk drive or a flash memory, a volatile storage device 230, such as a RAM, a printing execution unit 240 which is a laser print engine, an operating unit 260 which includes one operation button 30 (FIG. 3) (described below), a display unit 270 which includes a plurality of display lamps 11 to 15 (described below), and a communication unit 280 which includes an interface for performing data communication with an external device, such as a personal computer (not shown). The operating unit 260 of this illustrative embodiment does not include many buttons or a touch panel. The display unit 270 does not include a display panel, such as a liquid crystal display. A complicated operation, such as various settings, is made through a printer driver installed on a personal computer (not shown) or the like.

The volatile storage device 230 includes a buffer region 231 which temporarily stores various intermediate data generated when the CPU 210 performs processing. The non-volatile storage device 220 stores a computer program 221 for controlling the printer 200.

The computer program 221 is stored in, for example, the non-volatile storage device 220 in advance upon shipment of the printer 200. The computer program 221 may be provided in the form recorded in a CD-ROM or the like or in the form to be downloaded from a server.

The CPU 210 executes the computer program 221 to control the entire printer 200. Specifically, the CPU 210 functions as a device control unit 110 and a UI control unit 120. The device control unit 110 performs control such that the printing execution unit 240 realizes the main function, such as printing processing, of the printer 200. The UI control unit 120 performs control relating to a user interface using the operating unit 260, the display unit 270, or the like, that is, receives operation from the user through the operating unit 260, provides information associated with the printer 200 to the user through the display unit 270, or the like.

Figure 2:
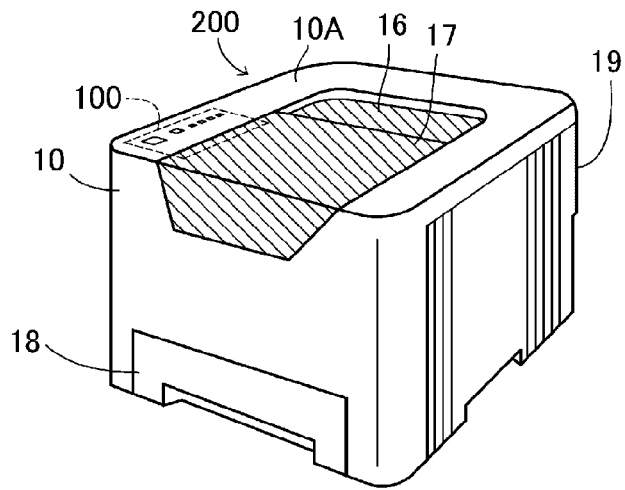
FIG. 2 is an outer perspective view of a printer 200.
Figure 3:
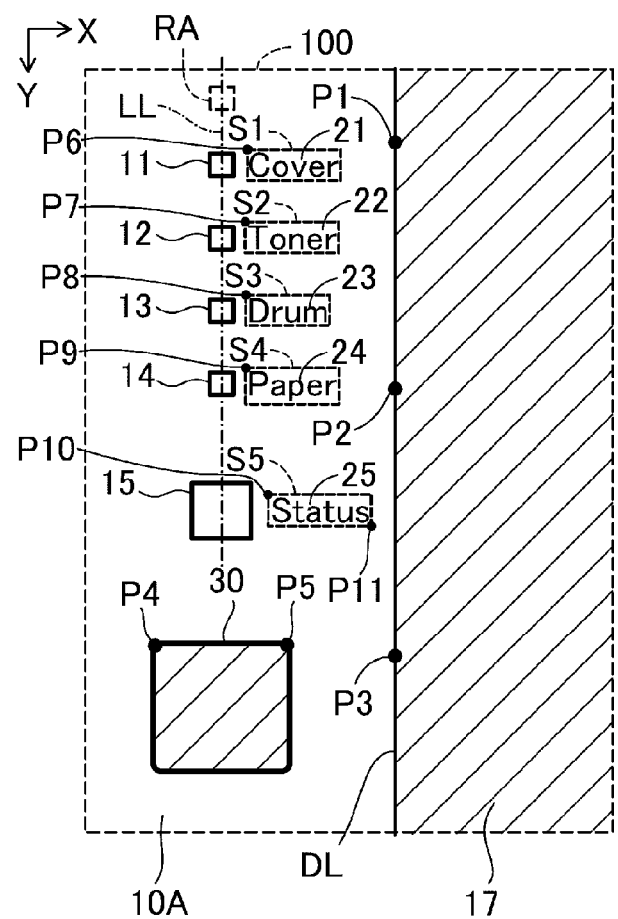
FIG. 3 is an enlarged view of a specific region 100 of the printer 200.

FIG. 2 is an outer perspective view of the printer 200. FIG. 3 is an enlarged view of a specific region 100 of the printer 200. As shown in FIG. 2, the printer 200 includes a housing 10 having a rectangular parallelepiped shape. In the bottom portion of the housing 10, a paper tray 18 which stores papers is mounted to be drawable from the front lateral surface. In the rear lateral surface of the housing 10, a cover 19 is openably mounted. For example, the cover 19 is opened/closed when eliminating paper jam or when replacing toner cartridge or the like. In a top surface 10A of the housing 10, an opening 16 through which a printed paper is discharged is formed, and a top surface member 17 which functions as a discharge tray for storing the printed paper discharged from the opening 16 is provided.

As shown in FIG. 3, in a specific region 100 at a corner in the top surface 10A of the housing 10, the plurality of display lamps 11 to 15 and one operation button 30 are arranged. The plurality of display lamps 11 to 15 are arranged at substantially regular intervals along a lamp arrangement line LL in a Y direction of FIG. 3. The plurality of display lamps 11 to 15 are configured by, for example, LEDs, and are used to display a plurality of device states of the printer 200, for example, a normal state (for example, a print job standby state or a printing state) and an error state (for example, a state of a toner empty or a state of out of paper).

Near the plurality of display lamps 11 to 15, specifically, on the right side (+X direction) of FIG. 3, character strings 21 to 25 relating to the corresponding display lamps are marked. The character strings 21 to 25 are colored (for example, black) to have high contrast with respect to the color (for example, white) of the top surface 10A of the housing 10 from the viewpoint of visibility. For example, the character string 21 corresponding to the display lamp 11 is "Cover", and represents that the display lamp 11 is used to display the state relating to the cover 19.

As shown in FIG. 3, in the top surface 10A, on the right side of a region (hereinafter, referred to as "panel region") where the plurality of display lamps 11 to 15 and the character strings 21 to 25, and the operation button 30 are arranged, the top surface member 17 is arranged. As a result, a parting line DL appears between the panel region and the top surface member 17.

The server 60 is a known computer, and executes a server program (not shown) to provide a Web service to the portable terminal 400 or a client computer, such as a personal computer (not shown). The Web service is a service which provides support information to the user, and a storage unit 65 of the server 60 stores a support information group 651 for supporting the user of the printer 200 in a format of a Web page. For example, the server 60 is operated by a vendor who sells the printer 200 as a product.

The portable terminal 400 is, for example, a multi-function mobile phone, such as a smartphone, owned by the user of the printer 200. The portable terminal 400 includes a CPU 410, a non-volatile storage device 420, such as a flash memory, a volatile storage device 425 including a RAM or the like and used as a buffer region 427, a wireless IF unit 430, a telephone IF unit 440, a voice processing unit 450 which includes a speaker and a microphone and realizes a telephone function or the like, an operating unit 460 which includes a touch panel, operation keys, and the like, a display unit 470 which includes a liquid crystal panel or the like overlapped on the touch panel, and a camera 490 which performs imaging by using an image sensor.

The wireless IF unit 430 includes an antenna, and for example, performs wireless communication (wireless communication based on an infrastructure mode) through an access point (not shown). As described below, the wireless IF unit 430 is used when the portable terminal 400 accesses the server 60, or the like.

The telephone IF unit 440 includes an antenna, and performs wireless communication based on a mobile phone communication system (for example, W-CDMA) with a base station (not shown). The telephone IF unit 440 realizes, for example, a telephone, the connection to Internet 70 through the base station (not shown), and the like. Similarly to the wireless IF unit 430, the telephone IF unit 440 is used when the portable terminal 400 accesses the server 60, or the like.

The camera 490 can generate and acquire image data representing an imaging object (target) using an imaging element, such as a CCD or a CMOS.

The non-volatile storage device 420 stores a control program PG1, an information providing program PG2, a browser program PG3, a URL table DT1 in which a URL (Uniform Resource Locator) is described, and a feature information table DT2 in which feature information relating to the printer 200 is described.

The control program PG1 is a program which realizes a function of an OS (Operating System), a telephone function, a control function of the camera 490, and a basic function of the portable terminal 400. The browser program PG3 is a program which realizes a function as a Web browser for viewing a Web page. For example, the control program PG1 and the browser program PG3 are provided by the manufacturer of the portable terminal 400 and stored in advance upon shipment. The information providing program PG2 is a program which realizes processing for providing information relating to the printer 200 to the user in cooperation with the server 60. The information providing program PG2 is a program (also referred to as "application") which adds a new function to the portable terminal 400, and is provided by, for example, a provider (for example, the manufacturer of the printer 200) different from the manufacturer of the portable terminal 400 in the form to be downloaded from a predetermined server. Incidentally, the information providing program PG2 may be provided by the manufacturer of the portable terminal 400 or may be stored in advance upon shipment.

FIG. 4 is a diagram showing an example of the URL table DT1. The URL table DT1 includes a plurality of tables DT1a to DT1c corresponding to a plurality of types of printers (including the printer 200) to be subjected to information providing processing (described below). For example, a plurality of tables DT1a to DT1c record a state (status) of a printer and a URL used for acquiring information corresponding to the state of the printer in association with the display state of a plurality of display lamps. For example, in the table DT1a corresponding to a specific printer model (for example, the printer 200), a first state "Toner low" (a state where the toner cartridge is near the end of its expected life and will need to be replaced soon) of a printer and a first URL "http://aa . . . " are associated with the first display state of the plurality of display lamps 11 to 15. The first display state is a display state in which the display lamp 12 is "yellow blinking", the display lamp 15 is "green lighting", and other display lamps 11, 13, and 14 are "off". In the table DT1a, a second state "Paper jam" (a state where a paper jammed in the printing execution unit and printing cannot be executed) of a printer and a second URL "http://bb . . . " are associated with a second display state of the plurality of display lamps 11 to 15. The second display state is a display state in which the display lamp 11 and the display lamp 14 are "yellow blinking", the display lamp 15 is "red lighting", and other display lamps 12 and 13 are "off".

The URL (Uniform Resource Locator) is location information which represents the location in the server 60 of a Web page including support information associated with a state of a corresponding printer (also referred to a display state corresponding to a plurality of display lamps). The support information includes, for example, information associated with the error state, specifically, information relating to a solution to error, consumables (toner or photosensitive drum) necessary for solving an error, and the like. The support information is an example of state related information. As will be understood from the situation that a table is prepared for each type (model) of printer, even if the states of the printers are identical, if the models are different, corresponding URLs may be different. This is because the type (part number) of toner or photosensitive drum to be used may differ depending on the model, and the solution to an error may be different.

The feature information table DT2 (FIG. 1) includes an arrangement information table DTA (FIG. 5A), a display state information table DTB (FIG. 5B), an imaging information table DTC (FIG. 6), and a feature point information table DTD (FIG. 7).

FIGS. 5A and 5B are diagrams showing an example of a lamp information table. FIG. 5A shows the arrangement information table DTA in which the arrangement positions of the lamps are recorded. The arrangement information table DTA includes a plurality of tables DTAa to DTAc corresponding to a plurality of types of printers (for example, the printer 200) to be subjected to information providing processing. For example, in the table DTAa corresponding to a specific printer model, arrangement information representing the position and size of each of the plurality of display lamps 11 to 15 (FIG. 3) is recorded. For example, the arrangement information is represented by an X-Y coordinate system in which a predetermined position of the specific region 100 of the FIG. 3 is the origin (0, 0). For example, the predetermined position is relatively determined based on feature points, such as the positions of characters in the specific region 100. The X-Y coordinate system is the same coordinate system as a coordinate system, in which the position of each pixel in a captured image SI (FIG. 12A) (described below) is represented by an integer. The arrangement information of the respective display lamps includes the X coordinate and the Y coordinate (for example, X11 and Y11 of FIG. 5A) of the upper left corner of the display lamp, the width (the length in the X-axis direction, for example, W11 of FIG. 5A), and the height (the length in the Y-axis direction, for example, H11 of FIG. 5A). The table DTAa includes arrangement information, which defines a reference range for calculating threshold values Sth and Vth, in addition to the arrangement information of the display lamps. The threshold values Sth and Vth are used so as to specify the display state of the display lamps (whether or not emit light and emission color) in display state specifying processing (FIG. 14) (described below). The reference range is, for example, a rectangular range RA of FIG. 3, and is a portion on the surface of the housing 10 of the printer 200 which is comparatively close to the display lamps 11 to 15 and in which the display lamps 11 to 15 are not arranged.

As will be understood from the situation that a table is prepared for each type (model) of printer, the number of display lamps and the position and size of each display lamp may differ depending on the type of printer. For example, the number of display lamps is not limited to five (FIG. 3), and there is a model having four display lamps or a model having three display lamps. However, in this illustrative embodiment, a plurality of display lamps are arranged along one lamp arrangement line (for example, the line LL of FIG. 3) regardless of the model.

FIG. 5B shows the display state information table DTB in which the display state of the lamps is recorded. The display state information table DTB includes a plurality of tables DTBa to DTBc corresponding to a plurality of types of printers to be subjected to information providing processing. For example, in the table DTBa corresponding to a specific printer model, an allowable display state of each of the plurality of display lamps 11 to 15 (FIG. 3) is recorded.

The display state of one display lamp is one of four kinds of "yellow", "red", "green", and "blue" from the viewpoint of color (also referred to as "emission color) upon emission of the display lamp. The display state of one display lamp is one of three kinds of "off", "lighting", and "blinking" from the viewpoint of the emission form. The display state "off" is a display state in which the display lamp is maintained in a non-light emission state. The display state "lighting" is a display state in which the display lamp is maintained in a light emission state. The display state "blinking" is a display state in which the light emission state and the non-light emission state of the display lamp are repeated at a predetermined interval. In this illustrative embodiment, there are nine kinds (one kind of "off", four kinds (four colors) of "lighting", and four kinds (four colors) of "blinking") of display states by the combinations of the emission color and the emission form.

The display state "off" is an allowable display state of all of the display lamps, and is not recorded in the display state information table DTB of FIG. 5B. In the display state information table DTB of FIG. 5B, a circle described corresponding to each emission color represents an allowable display state of "lighting" for a corresponding emission color, and a double circle described corresponding to each emission color represents an allowable display state of "lighting" and "blinking" for a corresponding emission color. A cross described for each emission color represents that neither "lighting" nor "blinking" is performed in a corresponding emission color. As shown in FIG. 5B, some display lamp may perform "lighting" or "blinking" in a plurality of emission colors (for example, the display lamp 15 of FIG. 5B). As will be understood from the situation that a table is prepared for each type (model) of printer, an allowable display state of each display lamp may differ depending on the type of printer.

FIG. 6 is a diagram showing an example of the imaging information table DTC. In the imaging information table DTC, the imaging times and the imaging interval are recorded as imaging information for each of a plurality of types of printers to be subjected to information providing processing. The imaging times and the imaging interval will be described with automatic recognition processing (FIG. 10) (described below).

FIG. 7 is a diagram showing an example of the feature point information table DTD. The feature point information table DTD includes a plurality of tables DTDa to DTDc corresponding to a plurality of types of printers to be subjected to information providing processing. For example, in the table DTDa corresponding to a specific printer model, positional information representing the positions of a plurality of feature points in the specific region 100 (FIG. 3) is recorded (FIG. 7). For example, as shown in FIG. 7, a plurality of feature points include three points P1 to P3 (FIG. 3) arranged on the parting line DL. A plurality of feature points include points which define character regions S1 to S5 corresponding to a plurality of character strings 21 to 25 (FIG. 3). Specifically, the character regions S1 to S5 have a rectangular shape which is circumscribed in the respective character strings 21 to 25. In this illustrative embodiment, as shown in FIG. 7, information which defines the rectangular character regions S1 to S5 includes the X coordinates and the Y coordinates (for example, X31 and Y31 of FIG. 7) of upper left vertexes P6 to P10 (FIG. 3) of the respective character regions, the width (the length in the X-axis direction, for example, W31 of FIG. 7), and the height (the length in the Y-axis direction, for example, H31 of FIG. 7). A plurality of feature points include points P4 and P5 (FIG. 3) at both ends of upper side of the substantially rectangular operation button 30. These feature points are points which are referred to in captured image correction processing (FIGS. 11 and 12A to 12D) (described below), and are thus referred to as "reference points".

As will be understood from the situation that a table is prepared for each type (model) of printer, the positions of these reference points differ depending on the type of printer. However, in this illustrative embodiment, there is a design characteristic line (for example, the parting line DL of FIG. 3) parallel to the lamp arrangement line (for example, the line LL of FIG. 3) regardless of the type of printer. For this reason, in the tables DTDa to DTDc of the respective models, positional information of the three feature points on the design characteristic line is recorded.

Returning to FIG. 1, the CPU 410 executes the control program PG1 to function as a main control unit 55 which realizes the basic function of the portable terminal 400, and executes the browser program PG3 to function as a Web browser 50. The CPU 410 executes the information providing program PG2 to function as an information providing unit 300.

The information providing unit 300 includes an image data acquiring unit 310, a product information acquiring unit 320, a feature information acquiring unit 330, a specifying unit 340, a receiving unit 350, an identification information acquiring unit 360, and a browser control unit 370. The respective processing will be described below.

A-3. Processing of Information Providing Unit 300 of Portable Terminal 400

Figure 8:
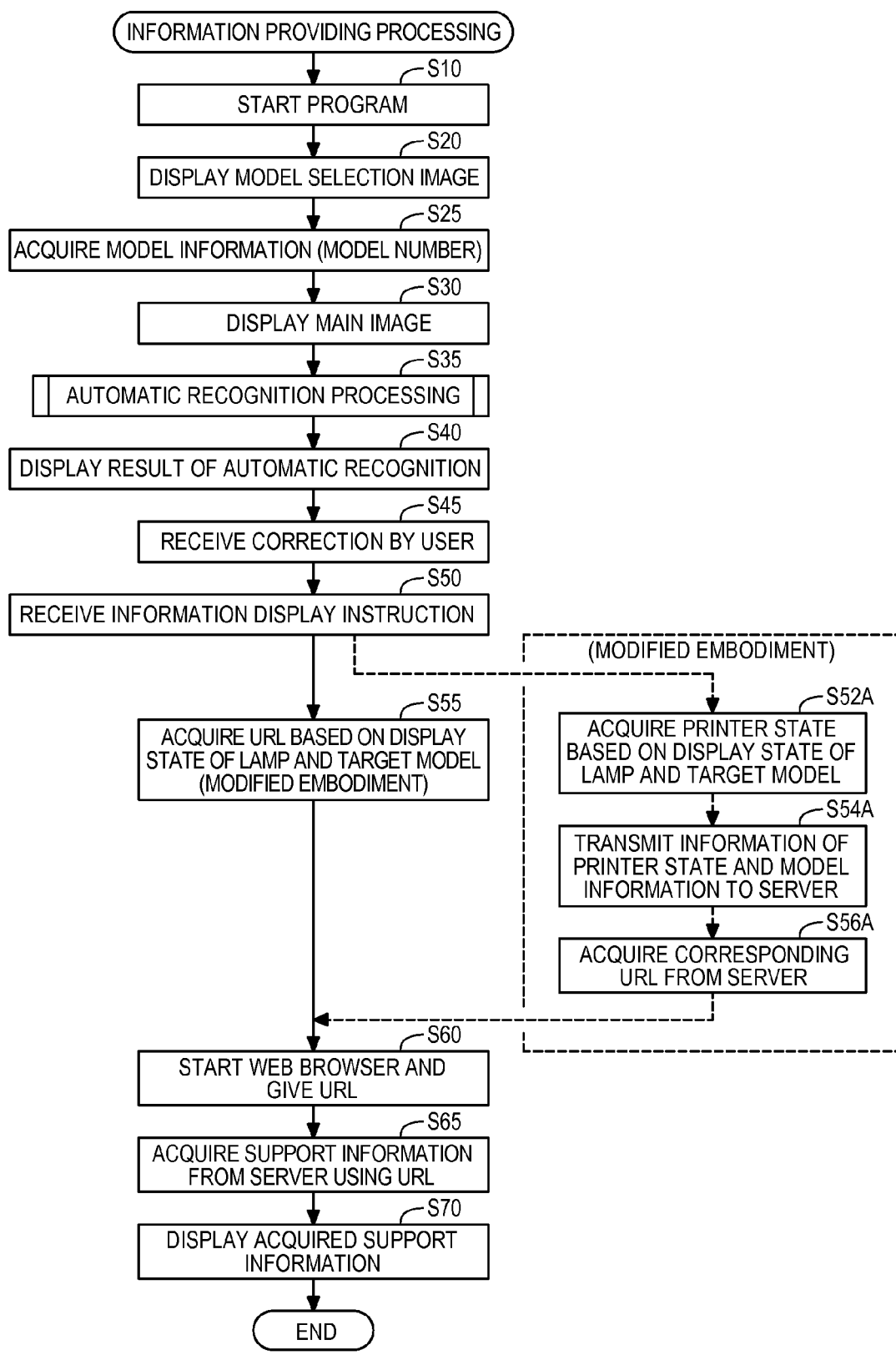
FIG. 8 is a flowchart of information providing processing.

FIG. 8 is a flowchart of information providing processing. The information providing processing is executed by the information providing unit 300 (FIG. 1), for example, when the information providing program PG2 is started by the user. For example, when the plurality of display lamps 11 to 15 are in a display state representing that the printer 200 is in a specific state, the user starts the information providing program PG2 so as to acquire information associated with the specific state of the printer 200. Specifically, for example, since the printer 200 is in an error state, such as toner empty, when the plurality of display lamps 11 to 15 become a display state representing the error state, the user starts the information providing program PG2 so as to know a solution to the error state in detail.

In Step S10, if the information providing unit 300 (information providing program PG2) starts and the information providing unit 300 becomes an operable state, the product information acquiring unit 320 displays a model selection image AI1 on the display unit 470 (Step S20).

Figure 9A:
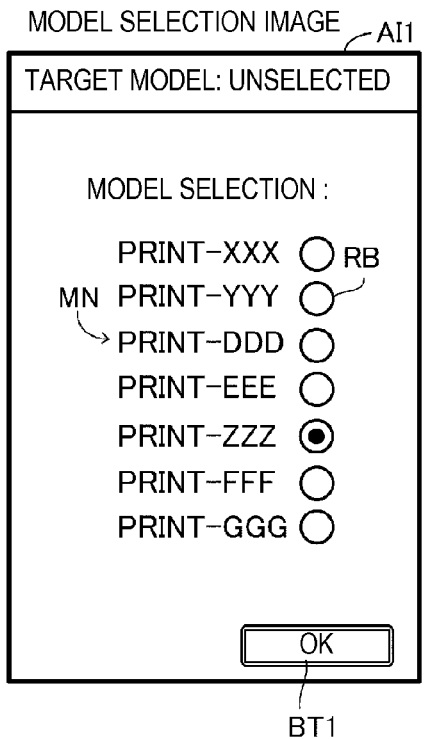
FIGS. 9A to 9D are diagrams showing examples of a UI image which is displayed by an information providing unit 300.

FIGS. 9A to 9D are diagrams showing examples of a UI image which is displayed by the information providing unit 300. FIG. 9A shows an example of the model selection image AI1. The model selection image AI1 includes a list MN of model information (for example, also referred to as "model number" or "product information") for identifying the model of the printer, which the information providing unit 300 supports, and a plurality of radio buttons RB corresponding to the plurality of model information. The user touches an OK button BT1 after one radio button RB is ON to select the model (target model) of the printer.

In Step S25, the product information acquiring unit 320 acquires model information (for example, also referred to as "model number" or "product information") for identifying the target model based on the selection of the user. Hereinafter, an example in which the printer 200 described referring to FIGS. 1 to 3 is the target model will be described.

Figure 9B:
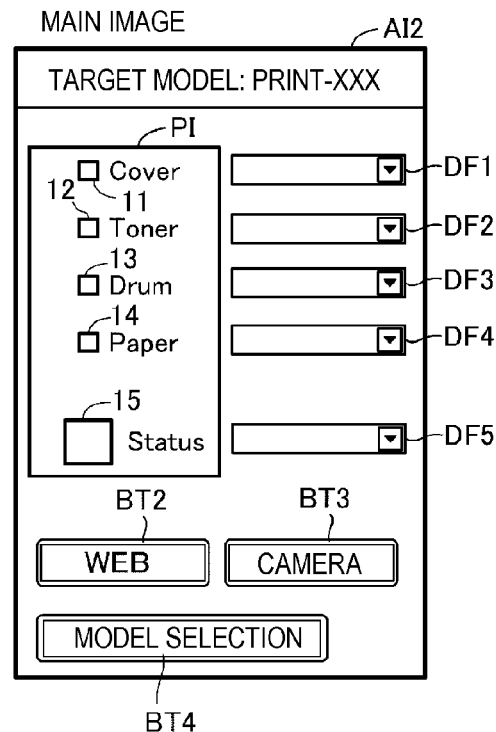

In Step S30, the information providing unit 300 displays a main image AI2 according to the target model identified by the acquired model information on the display unit 470. FIG. 9B shows an example of the main image AI2. The main image AI2 includes a partial image PI of the printer 200 of the target model, a plurality of fields DF1 to DF5 corresponding to the plurality of display lamps 11 to 15, a start button BT2 which receives the start instruction of the Web browser, an imaging button BT3 which receives the transition instruction to an imaging mode (that is, the transition to automatic recognition processing (described below)), and a model selection button BT4. The model selection button BT4 is a button for receiving the transition instruction to a model selection mode in which the above-described model selection image AI1 is displayed, and model selection is received from the user, and is pressed when changing the target model.

For example, the partial image PI is an image including a portion, in which each of the plurality of display lamps 11 to 15 is arranged, of the above-described specific region 100 (FIG. 3). A plurality of fields DF1 to DF5 are respectively arranged at the positions corresponding to the plurality of display lamps 11 to 15 in the partial image PI, that is, on the right side of the plurality of display lamps 11 to 15. The type of partial image to be displayed and the number of fields to be displayed differ depending on the target model, that is, depending on the model information acquired in Step S25.

The user may input the display state of the respective display lamps to the plurality of fields DF1 to DF5, or may press the imaging button BT3 to perform the transition to automatic recognition processing (described below). The user may press the model selection button BT4 to change the target model. That is, these kinds of processing are executed in accordance with the selection of the user. Here, in order to avoid complication, overall processing will be described assuming that the automatic recognition processing is first executed in accordance with operation of the user, and thereafter, the input (the correction of the result of the automatic recognition processing) of the user on the plurality of fields DF1 to DF5 is received (FIG. 8).

Figure 10:
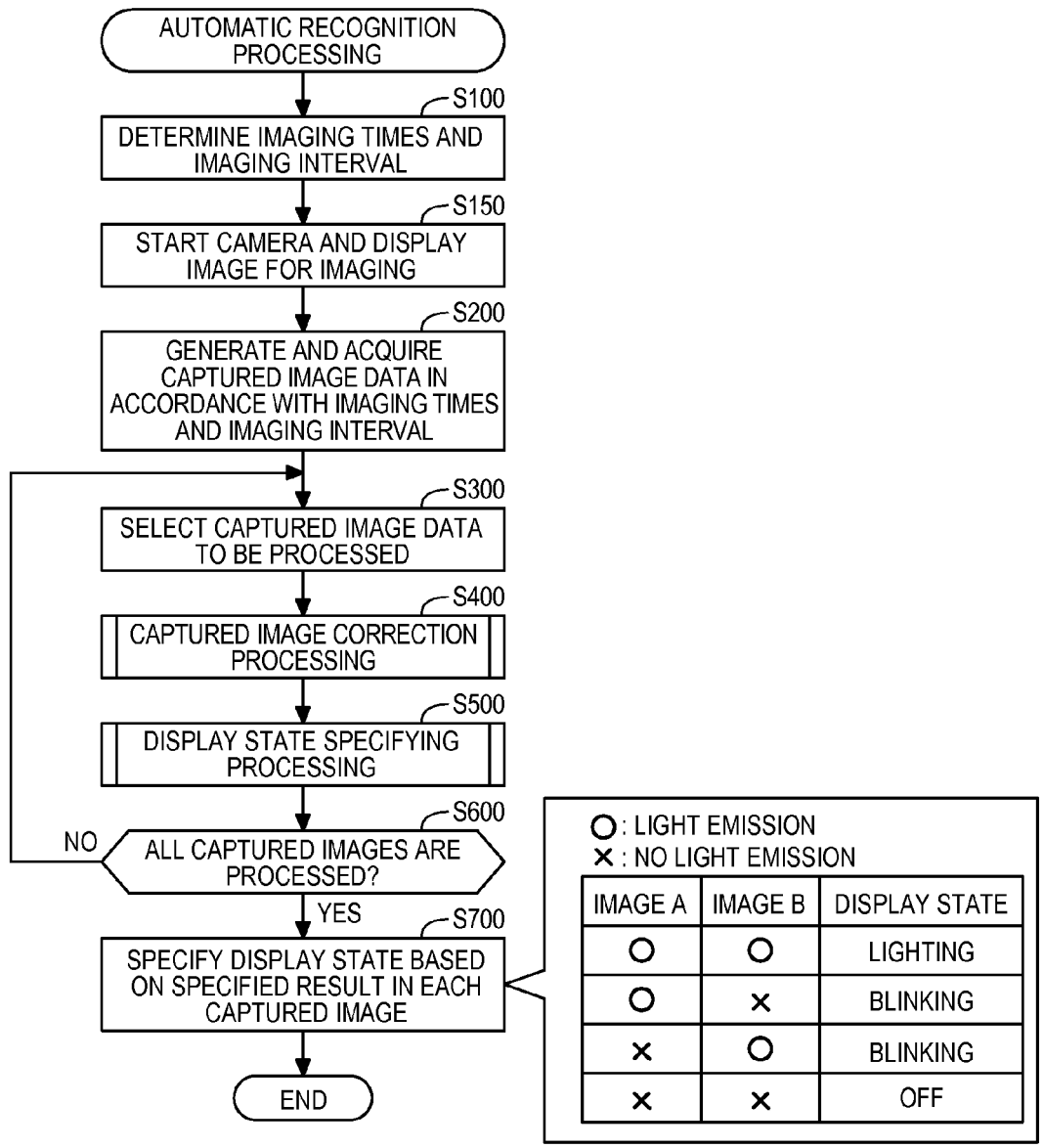
FIG. 10 is a flowchart of automatic recognition processing.

In Step S35, the automatic recognition processing is executed in accordance with operation of the user. The automatic recognition processing is processing in which one or a plurality of captured image data generated by imaging the specific region 100 of the printer 200 are analyzed to recognize (specify) the display state of the plurality of display lamps 11 to 15 in the captured image. FIG. 10 is a flowchart of automatic recognition processing.

In Step S100 of FIG. 10, the image data acquiring unit 310 determines the imaging times and the imaging interval of the target model by referring to the imaging information table DTC (FIG. 6). If there is no display lamp, in which "blinking" is included in the allowable display state, out of a plurality of display lamps of the target model, that is, when the allowable display state is one of "lighting" and "off", the imaging times is set to one, and the imaging interval is not set (for example, a model B of FIG. 6). If there is a display lamp, in which "blinking" is included in the allowable display state, out of a plurality of display lamps of the target model, the imaging times is set to two, and the imaging interval is set to the same interval as a blinking interval (for example, a model A of FIG. 6).

In this illustrative embodiment, the form of "blinking" of the display lamp is one kind, and a light emission state and a non-light emission state are repeated at a regular blinking interval (for example, one second). For this reason, if the display lamp is imaged twice at the same interval as the blinking interval, when the display lamp performs "blinking", unless a specific case is made, one captured image includes the display lamp in the light emission state, and the other captured image includes the display lamp in the non-light emission state. As a result, it can be determined that the display lamp can perform "blinking" from the two captured images. The specific case refers to a case where imaging is performed twice at the moment of the start of light emission and the moment of the end of light emission. In this case, the display lamp in the light emission state may be included in both captured images, and the display lamp in the non-light emission state may be included in both captured images. However, there is a comparatively low probability that this case occurs.

Figure 9C:
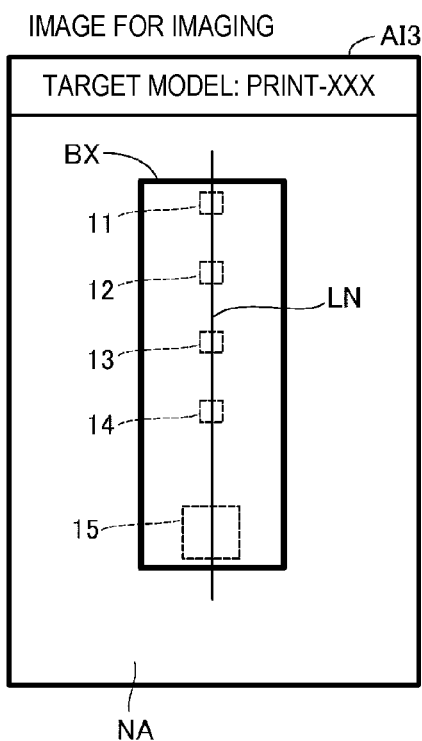

In Step S150, the image data acquiring unit 310 starts the camera 490 and the camera 490 becomes an imaging possible state, and also displays an image AI3 for imaging on the display unit 470. FIG. 9C shows an example of the image AI3. The image AI3 includes, as a guide image, a rectangular frame image BX and a line image LN extending in an upper-lower direction of FIG. 9C. In a different region NA of the image AI3, an image of a subject (for example, the display lamps 11 to 15) captured by the camera 490 is displayed. The frame image BX and the line image LN are displayed on the display unit 470 to be overlapped on an imaging target (for example, the specific region 100 including the display lamps 11 to 15) captured by the camera 490. The frame image BX and the line image LN are images which are used to guide the positions, in which the plurality of display lamps 11 to 15 as the imaging object should be located, to the user when the user images the specific region 100 (FIG. 3) of the printer 200. The user images the specific region 100 such that all of the plurality of display lamps 11 to 15 are located inside the frame image BX, and the lamp arrangement line LL (FIG. 3) of the plurality of display lamps 11 to 15 coincides with the line image LN. The plurality of display lamps 11 to 15 indicated by a broken line of FIG. 9C represent the ideal positions (also referred to as "target position") of the plurality of display lamps 11 to 15 at imaging.

In Step S200, the image data acquiring unit 310 generates and acquires captured image data which is obtained by imaging the specific region 100. For example, the image data acquiring unit 310 generates captured image data for the imaging times determined in Step S100 at the determined imaging interval with imaging operation of the user (the pressing of an arbitrary position in the display unit 470, or the like) as a trigger. The captured image data to be generated is bitmap data having the respective component values of R, G, and B as pixel values.

Figure 11:
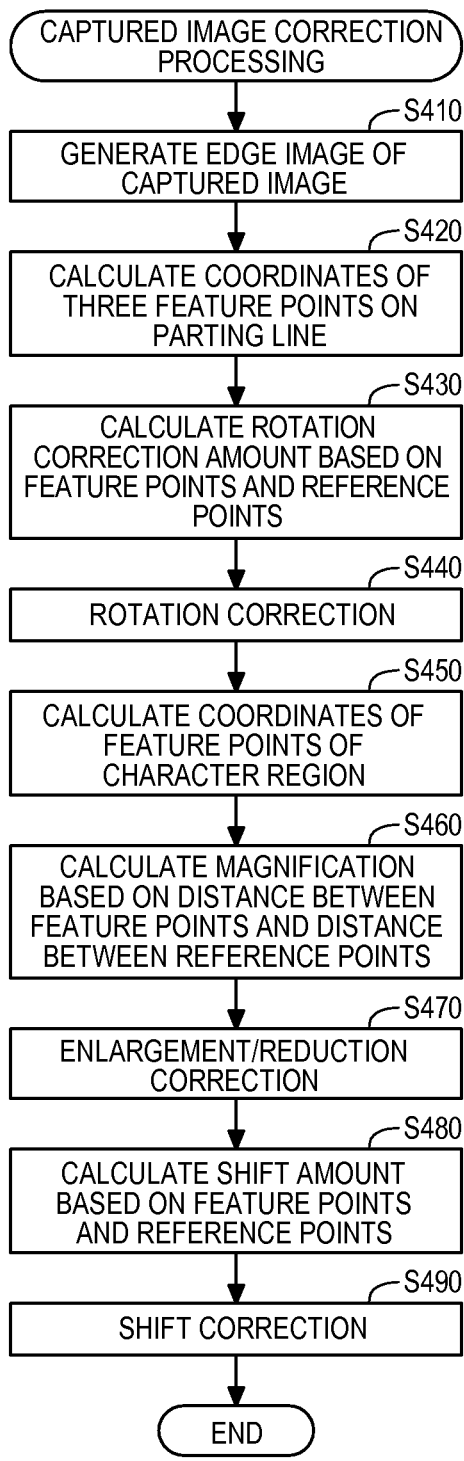
FIG. 11 is a flowchart of captured image correction processing.

In Step S300, the information providing unit 300 selects one captured image data to be subjected to captured image correction processing (S400) and display state specifying processing (S500) (described below) from one or more of generated captured image data. In Step S400, the information providing unit 300 executes the captured image correction processing on the selected captured image data. The captured image correction processing is processing for correcting the position of the imaging object (specifically, the display lamps 11 to 15) in the captured image using the positional information of the feature points recorded in the feature point information table DTD (FIG. 7). FIG. 11 is a flowchart of captured image correction processing. FIGS. 12A to 12D are first explanatory views of captured image correction processing. FIGS. 13A and 13B are second explanatory views of captured image correction processing.

Figure 12A:
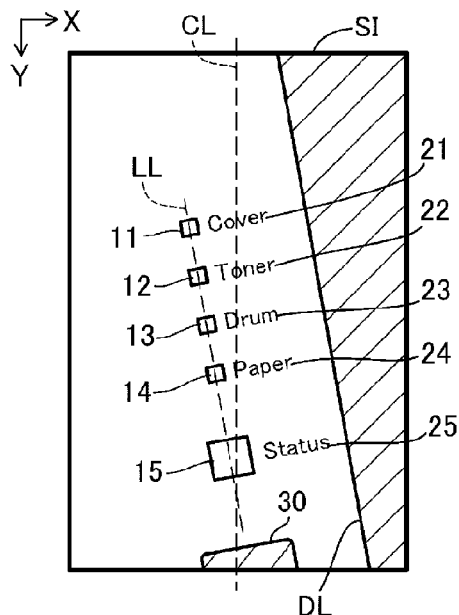
FIGS. 12A to 12D are first explanatory views of captured image correction processing.
Figure 13A:
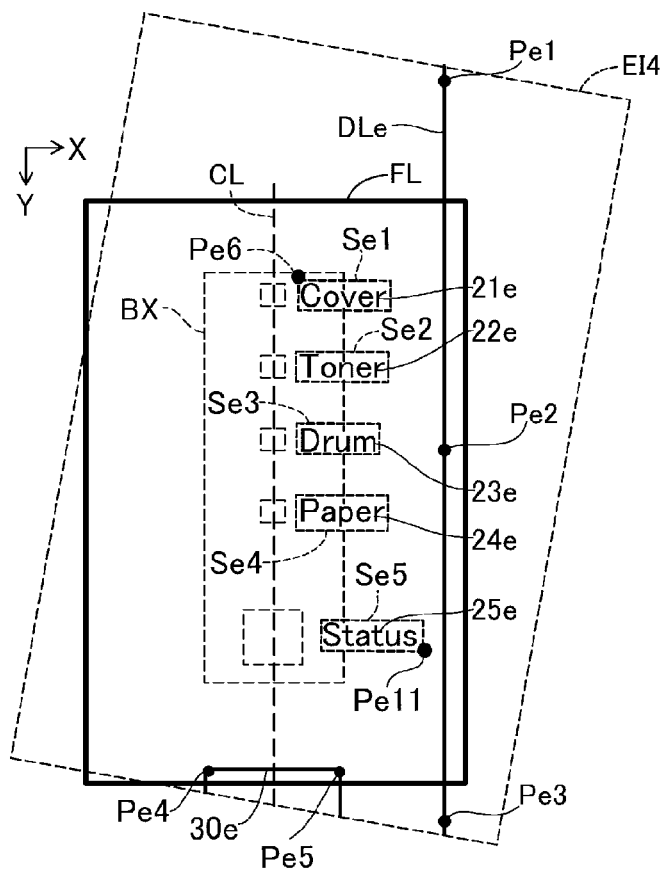
FIGS. 13A and 13B are second explanatory views of captured image correction processing.
Figure 13B:
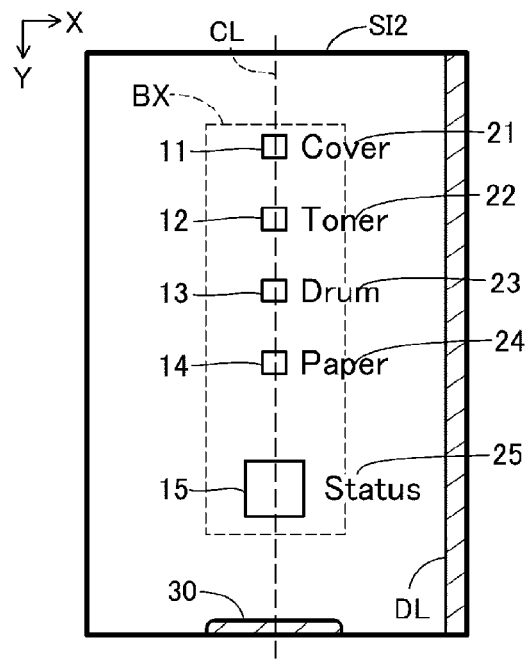

FIG. 12A shows an example of the captured image SI before the captured image correction processing, that is, the captured image SI represented by the captured image data generated in Step S200. A center line CL of FIG. 12A is a line which passes through the center of the captured image SI in the X direction and extends in the Y direction, and is an ideal line corresponding to the line image LN of the image AI3. There is a case where the actual positions of the display lamps 11 to 15 in the captured image SI are different from the target position and the target size (FIG. 9C). For example, in the captured image SI of FIG. 12A, since the lamp arrangement line LL of the plurality of display lamps 11 to 15 is inclined with respect to the center line CL, the positions of the plurality of display lamps 11 to 15 are deviated from the target position. Since the size of the plurality of display lamps 11 to 15 in the captured image SI of FIG. 12A is smaller than the target size, the positions of the plurality of display lamps 11 to 15 are deviated from the target position. The positions of the plurality of display lamps 11 to 15 are corrected so as to be close to the target position by captured image correction processing (described below).

In Step S410, the specifying unit 340 executes edge extraction processing on the captured image data to generate edge image data representing an edge image EI. The edge image data is obtained by converting the respective pixel values (RGB values) included in the captured image data to a luminance value Y and applying a known Sobel filter to the luminance value Y. In generating of the edge image data, instead of the Sobel filter, various edge extraction filters, such as a Prewitt filter and a Roberts filter, may be used.

Figure 12B:
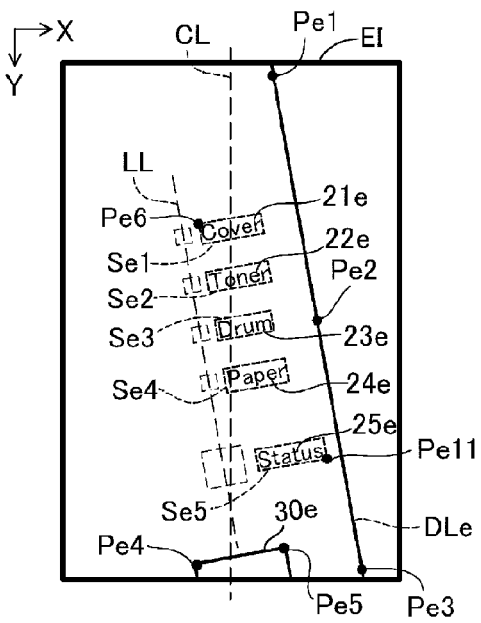

FIG. 12B shows an example of the edge image EI which is represented by edge image data. In the edge image EI, edges 21e to 25e of the character strings 21 to 25, an edge DLe of the parting line DL, and an edge 30e of a border of the operation button 30 appear comparatively clearly. In the edge image EI, the edges of the plurality of display lamps 11 to 15 may not appear clearly. For example, the edge of the lighting lamp out of the display lamps 11 to 15 may not appear clearly due to flare (a phenomenon in which light of the lamp spreads to the periphery of the lamp) caused by light of the lamp. Since the color of the off lamp out of the display lamps 11 to 15 has lower contrast to an ambient (background) color than the character strings 21 to 25, the edge of the off lamp may not appear clearly.

In Step S420, the specifying unit 340 calculates the coordinates of three feature points Pe1 to Pe3 (FIG. 12B) on the edge DLe in the edge image EI corresponding to the parting line DL. Specifically, the information providing unit 300 analyzes edge image data to specify the linear edge DLe in the edge image EI. The edge DLe is specified using a known line detection algorithm (for example, Hough transformation or the like). The information providing unit 300 sets three feature points in total by one feature point in each of the upper end portion, the central portion, and the lower end portion of the detected edge DLe, and calculates the coordinates of these feature points.

In Step S430, the specifying unit 340 calculates a rotation correction amount θ based on the three feature points Pe1 to Pe3 calculated on the edge image EI and three corresponding reference points. The three reference points are three corresponding feature points (reference points) P1 to P3 (FIG. 3) recorded in the tables (FIG. 7) of the target model in the feature point information table DTD. Specifically, the information providing unit 300 calculates the angle between a line connecting the three feature points P1 to P3 and a line connecting the three reference points P1 to P3 as the rotation correction amount θ.

Figure 12C:
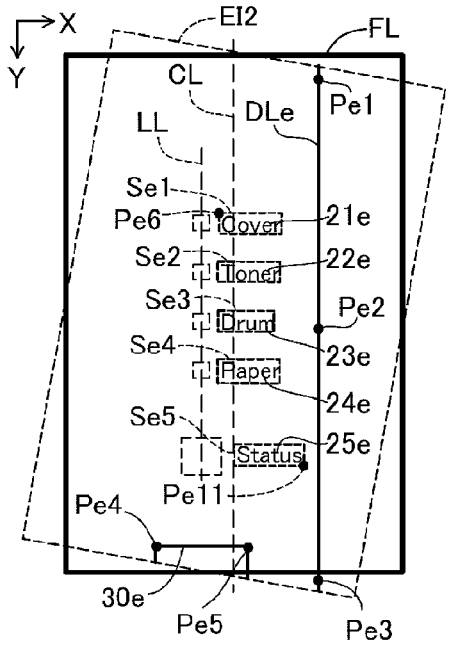
Figure 12D:
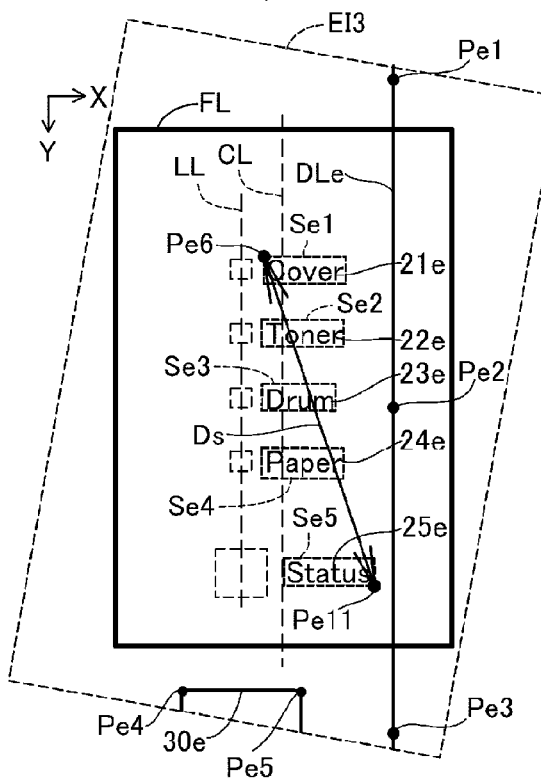

In Step S440, the specifying unit 340 executes rotation correction to rotate the edge image EI in accordance with the rotation correction amount θ calculated in Step S430. FIG. 12C shows the edge image EI2 after rotation correction. It is understood that the edge image EI2 of FIG. 12C is corrected such that the edge LDe at which the three feature points Pe1 to Pe3 are located is parallel to the Y direction. As a result, the lamp arrangement line LL in the edge image EI2 becomes parallel to the center line CL. In FIGS. 12C, 12D, and 13A, a bold rectangular frame FL is the border of the captured image SI before correction and the edge image EI, and is shown for ease of understanding about the movement of the subject by correction. The upper left corner of the bold rectangular frame FL is the origin of the X-Y coordinate system for use in image processing.

In Step S450, the specifying unit 340 calculates the coordinates of the two feature points Pe6 and Pe11 of the character region in the edge image EI2 after rotation correction. Specifically, the specifying unit 340 specifies a plurality of character regions Se1 to Se5 corresponding to the plurality of character strings 21 to 25 in the edge image EI2. The character region may be specified by using a known character region detection algorithm. For example, in the character regions, there densely exist edge pixels having an edge amount equal to or greater than a reference value. For this reason, for example, the specifying unit 340 divides the edge image EI2 into a plurality of blocks having a predetermined size and specifies a plurality of character blocks in which the density of edge pixels is equal to or greater than a reference value. The specifying unit 340 specifies a plurality of adjacent character blocks as one character block region. The specifying unit 340 specifies a region, which is defined by a rectangle circumscribed in an edge pixel group in one specified character block region, as one character region. The specifying unit 340 specifies the upper left vertex of the character region Se1 at the upper end and the lower right vertex of the character region Se5 at the lower end out of the plurality of specified character regions Se1 to Se5 as two feature points Pe6 and Pe11 of the character regions, and calculates the coordinates of these feature points.

In Step S460, the specifying unit 340 calculates the magnification FP (Dr/Ds) for enlargement/reduction correction based on the distance Ds between the two feature points Pe6 and Pe11 of the character regions and the distance Dr between the two corresponding reference points P6 and P7 (FIG. 3). The coordinates of the two corresponding reference points P6 and P7 are calculated based on information which defines the character regions S1 and S5 (FIG. 3) recorded in the tables (FIG. 7) of the target model in the feature point information table DTD.

In Step S470, the specifying unit 340 executes enlargement/reduction correction to enlarge or reduce the edge image EI2 in accordance with the magnification FP calculated in Step S460. If the magnification FP>1, the edge image EI2 is enlarged. If the magnification FP<1, the edge image EI2 is reduced. FIG. 12D shows an edge image EI3 after enlargement/reduction correction. The edge image EI3 of FIG. 12D is corrected such that the distance Ds between the two feature points Pe6 and Pe11 before correction becomes equal to the distance Dr between the two corresponding reference points P6 and P7. As a result, it is understood that enlargement is made such that the size of a portion corresponding to each of the plurality of display lamps 11 to 15 in the edge image EI3 is close to the target size shown in FIGS. 9A to 9D.

In Step S480, the specifying unit 340 calculates a shift amount (a shift amount ΔX in the X direction and a shift amount ΔY in the Y direction) based on a plurality of feature points in the edge image EI3 after enlargement/reduction correction and a plurality of corresponding reference points. As a plurality of feature points, for example, the upper left vertexes of the respective character regions Se1 to Se5 (FIG. 12D) and the two vertexes Pe4 and Pe5 of the operation button 30 are used. A plurality of reference points are corresponding reference points recorded in the tables (FIG. 7) of the target model in the feature point information table DTD. Specifically, the average value of the difference values between the X coordinates of a plurality of feature points and the X coordinates of the corresponding reference points is calculated as the shift amount ΔX in the X direction. Similarly, the average value of the difference values between the Y coordinates of a plurality of feature points and the Y coordinates of the corresponding reference points is calculated as the shift amount ΔY in the Y direction.

In Step S490, the specifying unit 340 executes shift correction to move the edge image EI3 in parallel by the calculated shift amount. FIG. 13A shows an edge image EI4 after shift correction. In FIG. 13A, the frame image BX of FIG. 9C is indicated by a broken line for reference. In the edge image EI4 of the FIG. 13A, it is understood that the positions of the plurality of display lamps 11 to 15 substantially become equal to the target position shown in FIG. 9C. That is, in the edge image EI4 of FIG. 13A, the portions corresponding to the plurality of display lamps 11 to 15 are arranged at appropriate intervals along the center line CL.

FIG. 13B shows a captured image SI2 after correction when correction (rotation correction, enlargement/reduction correction, and shift correction) on the edge image EI is executed on the captured image SI (FIG. 12A). The correspondence relationship between the coordinate (X1, Y1) of a pixel in the edge image EI before correction and the coordinate (X2, Y2) of a pixel in the edge image EI4 after correction is the same as the correspondence relationship between the coordinate (Xa, Ya) of a pixel in the captured image SI (FIG. 12A) before correction and the coordinate (Xb, Yb) of a pixel in the captured image SI2 after correction. Accordingly, the specifying unit 340 can specify the value (respective component values of RGB) of a pixel corresponding to an arbitrary coordinate (Xa, Xb) in the captured image SI2 after correction. Although the specifying unit 340 may actually generate image data representing the captured image SI2 after correction, it may suffice that the value of a pixel within a lamp range for use in display state specifying processing (Step S500 of FIG. 10, FIG. 14) (described below) can be specified, without generating image data representing captured image SI2 after correction.

Figure 14:
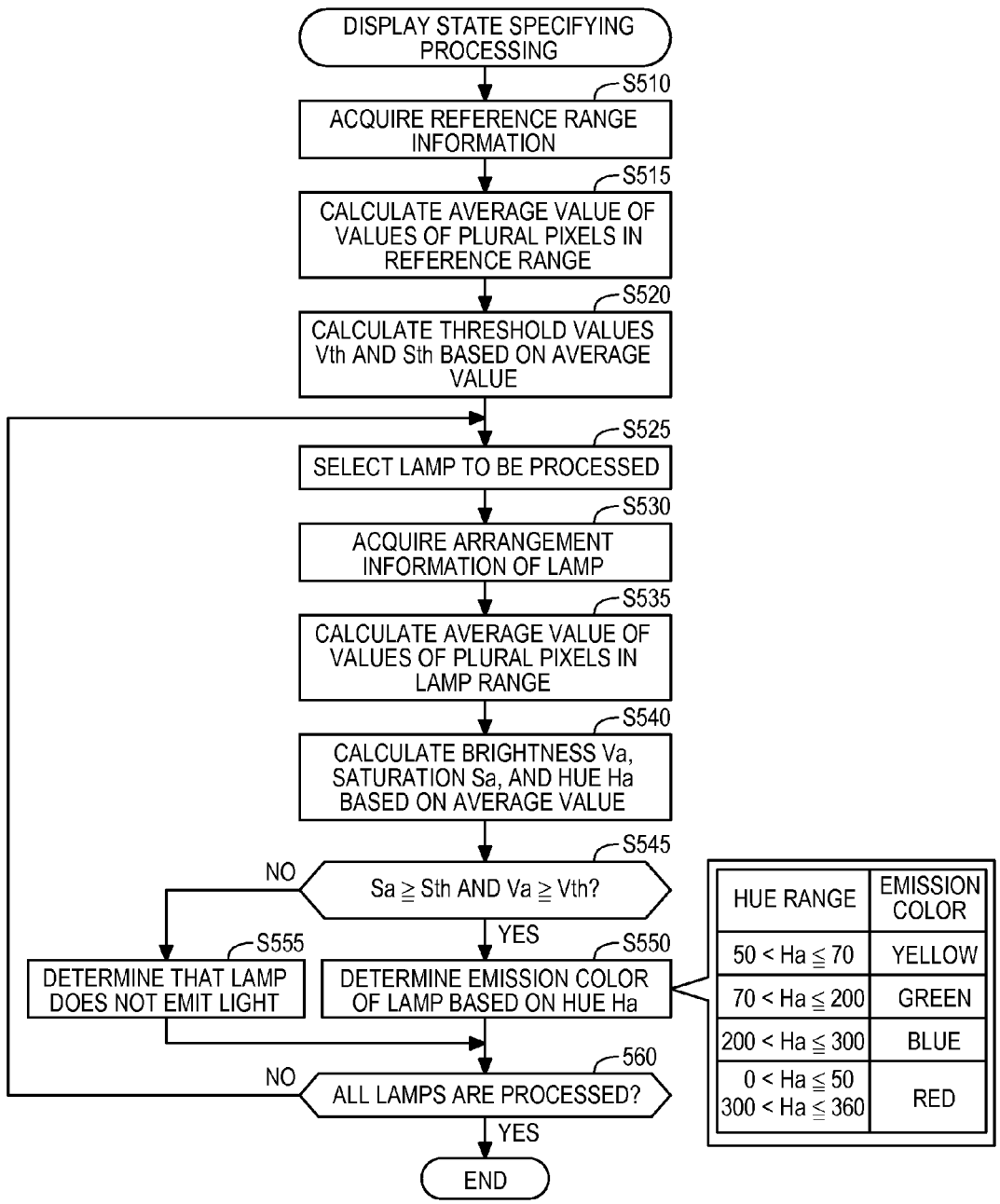
FIG. 14 is a flowchart of display state specifying processing.

If the captured image correction processing ends, in Step S500 of FIG. 10, the specifying unit 340 executes display state specifying processing. The display state specifying processing is processing for specifying the display state of the plurality of display lamps 11 to 15 in the captured image SI represented by captured image data to be processed, specifically, the emission color (yellow, red, blue, and green). FIG. 14 is a flowchart of display state specifying processing.

In Step S510, the specifying unit 340 acquires reference range information (FIG. 5A) representing the reference range for threshold value calculation from the tables corresponding to the target model in the arrangement information table DTA.

In Step S515, the specifying unit 340 calculates the average value of the values (RGB values) of a plurality of pixels within the reference range defined by the reference range information in the captured image SI2 after correction for the respective three components of RGB.

In Step S520, the specifying unit 340 calculates the threshold value Vth of brightness and the threshold value Sth of saturation based on the average value (Rave, Gave, Bave) of the three components of RGB. Specifically, the specifying unit 340 calculates brightness and saturation of a color represented by the average value (Rave, Gave, Bave) of the three components as the threshold value Vth of brightness and the threshold value Sth of saturation using a conversion expression (1) which transforms the color representing values of a RGB color space to the color representing values of an HSV color space. In the conversion expression (1), MAX represents the maximum value out of the three component values of R, G, and B, and MN represents the minimum value out of the three component values of R, G, and B.

[Equation 1]

$$H = \begin{cases} 60 \times \frac{G-B}{MAX-MIN} & \text{(when MAX} = R) \\ 60 \times \frac{B-R}{MAX-MIN} + 120 & \text{(when MAX} = G) \\ 60 \times \frac{R-G}{MAX-MIN} + 240 & \text{(when MAX} = B) \end{cases} \quad (1)$$

(360 is added when $H < 0$)

$$S = \frac{MAX - MIN}{MAX}$$

$$V = \frac{MAX}{255}$$

In Step S525, the specifying unit 340 selects a lamp to be processed. In the example of the captured image SI2 of FIG. 13B, one display lamp is selected as a lamp to be processed from the five display lamps 11 to 15.

In Step S530, the specifying unit 340 acquires the arrangement information (FIG. 5A) representing the position and size of a display lamp to be processed from the tables corresponding to the target model in the arrangement information table DTA.

In Step S535, the specifying unit 340 calculates the average value of the values (RGB values) of a plurality of pixels within a range (also referred to as "lamp range"), in which the display lamp to be processed defined by the arrangement information is arranged, in the captured image SI2 after correction for three components of RGB.

In Step S540, the specifying unit 340 calculates brightness Va, saturation Sa, and hue Ha of the color of the display lamp to be processed based on the average value (Rave, Gave, Bave) of the three components. Specifically, the specifying unit 340 calculates the brightness Va, saturation Sa, and hue Ha of the color represented by the average value (Rave, Gave, Bave) of the three components using the conversion expression (1).

In Step S545, the specifying unit 340 determines whether the saturation Sa of the display lamp to be processed is equal to or greater than the threshold value Sth of saturation and the brightness Va of the display lamp to be processed is equal to or greater than the threshold value Vth of brightness.

When saturation Sa is smaller than the threshold value Sth or when the brightness Va is smaller than the threshold value Vth (Step S545: NO), the specifying unit 340 determines that the display lamp to be processed does not emit light (Step S555). When the saturation Sa is equal to or greater than the threshold value Sth and the brightness Va is equal to or greater than the threshold value Vth (Step S545: YES), the specifying unit 340 determines that the display lamp to be processed emits light, and executes Step S550.

In Step S550, the specifying unit 340 determines the emission color of the display lamp to be processed based on the hue Ha of the display lamp to be processed. Specifically, as shown in FIG. 14, the specifying unit 340 determines the emission color referring to the hue range defined for each emission color. If the hue Ha is within a range of 50<Ha≤70, it is determined that the emission color is yellow, and if the hue Ha is within a range of 70<Ha≤200, it is determined that the emission color is green. If the hue Ha is within a range of 200<Ha≤300, it is determined that the emission color is blue, and if the hue Ha is within a range of 300<Ha≤360 or 0<Ha≤50, it is determined that the emission color is red.

In Step S560, the specifying unit 340 determines whether all display lamps of the target model are processed. If there is an unprocessed display lamp (Step S560: NO), the specifying unit 340 returns to Step S525 and repeats the processing of Steps S530 to S555 on the unprocessed display lamp. If all display lamps are processed (Step S560: YES), the specifying unit 340 ends the display state specifying processing.

If the display state specifying processing ends, in Step S600 of FIG. 10, the specifying unit 340 determines whether all captured images are processed. If there is an unprocessed captured image (Step S600: NO), the specifying unit 340 returns to Step S300 and repeats the processing of Steps S300 to S500 on the unprocessed captured image. If all captured images are processed (Step S600: YES), the specifying unit 340 proceeds to Step S700.

In Step S700, the specifying unit 340 specifies the final display state of a plurality of display lamps based on the specified result using the captured image. Specifically, if the number of captured images is one, the specifying unit 340 directly utilizes the specified result using one captured image as the final specified result. If the number of captured images is two, the specifying unit 340 determines the final specified result based on the two specified results using the two captured images. For example, as shown in a table of FIG. 10, for the target display lamp, if both a specified result using a first captured image (referred to as "image A") and a specified result using a second captured image (referred to as "image B") are "light emission", the display state of the target display lamp is specified to be "lighting". If both the specified result using the image A and the specified result using the image B are both "non-light emission", the display state of the target display lamp is specified to be "off". If the specified result using one of the image A and the image B is "light emission" and the specified result using the other image is "non-light emission", the display state of the target display lamp is specified to be "blinking". If the final specified results of all display lamps are determined, the automatic recognition processing ends.

Figure 9D:
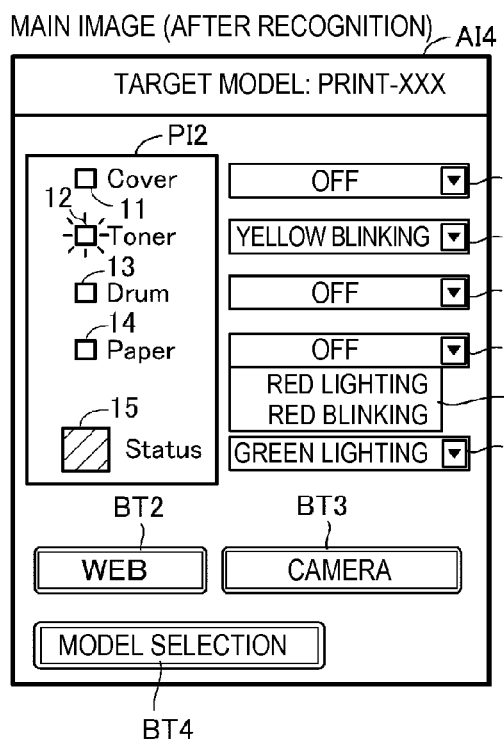

If the automatic recognition processing ends, in Step S40 of FIG. 8, the information providing unit 300 displays the display state of the display lamps specified by the automatic recognition processing on the display unit 470. FIG. 9D shows an example of a main image AI4 after automatic recognition processing. In the example of FIG. 9D, it is understood that the display state (specified results) of the display lamps is displayed in the plurality of fields DF1 to DF5 corresponding to the plurality of display lamps 11 to 15. In a partial image PI2 in the main image AI4, the images (for example, the images of the display lamps 12 and 15 of FIG. 9D) of the display lamps are updated in accordance with the display state (specified results) of the display lamps.

In Step S45, the receiving unit 350 receives the correction of the display state of the display lamps specified by the automatic recognition processing through the plurality of fields DF1 to DF5. If the user touches a field (for example, the field DF4) corresponding to a display lamp to be corrected out of the plurality of fields DF1 to DF5, as shown in FIG. 9D, the receiving unit 350 displays a pull-down menu PM. The user selects a desired display state from a display state list displayed in the pull-down menu PM, thereby correcting the display state of the display lamps specified by the automatic recognition processing. Here, an allowable display state of the display lamp to be corrected is displayed in the pull-down menu PM, and a non-allowable display state of the display lamp to be corrected is not displayed. The receiving unit 350 refers to display state information recorded in the tables (FIG. 5B) of the target model in the display state information table DTB, and determines the display state (for example, in the example of FIG. 9D, red lighting and red blinking) which should be displayed in the pull-down menu PM. As a result, the user can smoothly select a desired display state. There are cases where the correction of the display state by the user is input and where the correction of the display state is not input. If the correction of the display state by the user is input, the display state after the correction by the user is given priority over the display state specified by the automatic recognition processing. That is, if the correction of the display state is received from the user, the final display state of the display lamps is specified in accordance with the correction result by the user.

If an information display instruction is received (Step S50), that is, if the start button BT2 in the main image AI4 is pressed by the user, the identification information acquiring unit 360 acquires a URL as identification information based on the specified display state of the display lamps and the target model (Step S55). Specifically, the identification information acquiring unit 360 refers to the tables (FIG. 4) of the target model in the URL table DT1, and acquires a URL associated with the specified display state of the display lamps. For example, if the table DT1a of FIG. 4 is referred to, and if the specified display state of the plurality of display lamps 11 to 15 shown in FIG. 3 is "off", "yellow blinking", "off", "off", and "green lighting", respectively, "http://aa . . . " is acquired as a URL.

In Step S60, the browser control unit 370 causes the CPU 410 to execute the browser program PG3 (FIG. 1) so as to start the Web browser 50 (FIG. 1) and passes the URL acquired in Step S50 to the Web browser 50.

In Step S65, the Web browser 50 acquires the support information from the server 60 based on the URL acquired from the browser control unit 370. For example, if the URL acquired from the browser control unit 370 is the first URL (for example, "http://aa . . . " of FIG. 4), first support information identified by the first URL is acquired from a first storage region (for example, a storage region corresponding to a specific folder) in the storage unit 65 of the server 60 identified by the first URL. Similarly, for example, if the URL acquired from the browser control unit 370 is a second URL (for example, "http://cc . . . " of FIG. 4), second support information identified by the second URL is acquired from a second storage region in the storage unit 65 of the server 60 identified by the second URL. In Step S70, the Web browser 50 displays the acquired support information on the display unit 470. In other words, the browser control unit 370 acquires the support information as state related information using the Web browser 50, and also displays the acquired support information on the display unit 470 using the Web browser 50. That is, the browser control unit 370 is an example of a state related information acquiring unit and an output control unit.

Figure 15:
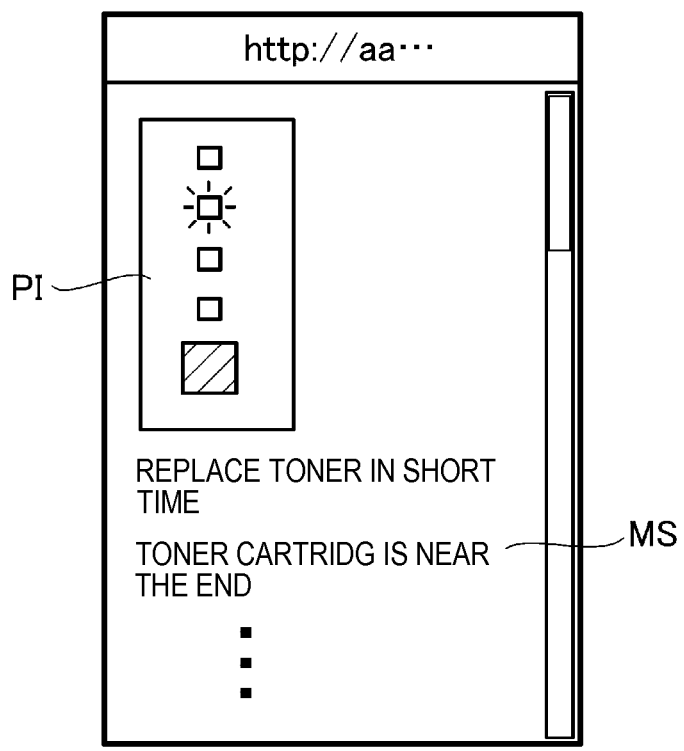
FIG. 15 shows an example of a display image AI5 of support information.

FIG. 15 shows an example of a display image AI5 of support information. The display image AI5 is an image of a page including support information corresponding to a specific state of the target model represented by the specified display state of the display lamps out of a plurality of Web pages provided by the server 60. As shown in FIG. 15, this page is a page which is created when the target model becomes the specific state assuming that the user of the target model refers to the page. The page illustrated in FIG. 15 is a page corresponding to a state in which the amount of residual toner is smaller than a reference value, and includes a message MS including the description of the state and a handling method, such as a toner replacement method or a purchase method.

According to the above-described illustrative embodiment, captured image data obtained by imaging one or more display lamps (for example, the five display lamps 11 to 15 (FIG. 3)) is analyzed, and the URL of the support information corresponding to the specific state (for example, the error state, such as toner empty) of the printer (for example, the printer 200 shown in FIGS. 1 and 3) of the target model represented by the display lamps is acquired. The support information is acquired based on the acquired URL and displayed on the display unit 470 of the portable terminal 400. As a result, the portable terminal 400 can provide appropriate information according to the state of the printer 200 to the user.

For example, if an error occurs in the printer 200, there is a case where the printer 200 does not easily provide sufficient information associated with the error, which currently occurs in the printer 200, to the user. In particular, like the printer 200 of this example, in the case of a printer including no liquid crystal display, it is comparatively difficult to provide sufficient information to the user with the printer 200 alone. As a result, there is a possibility that the user needs to perform a bothersome operation to examine the meaning of the display state of the display lamps referring to a manual or the like.

It can be considered that necessary information is printed by the printer 200 and information is provided to the user. However, if the printer 200 is in the error state, such as toner empty or paper jam, in which printing is impossible, it is not possible to provide information. Further, it can be considered that error information is transmitted from the printer 200 to a personal computer embedded with a printer driver and the error information is displayed on the personal computer. However, if the personal computer is away from the printer 200, this causes inconvenience. Further, if communication failure between the printer 200 and the personal computer occurs, it is not possible to provide information.

According to this illustrative embodiment, the portable terminal 400 can easily provide appropriate support information according to the state of the printer 200. That is, it should suffice that the user of the portable terminal 400 just images the specific region (FIG. 3) including the display lamps 11 to 15 of the printer 200. The portable terminal 400 can provide necessary support information regardless of the type (communication failure with an external apparatus or error, such as paper jam, for which printing is impossible) of error state of the printer 200. Since the portable terminal 400 is easily carried, it is easy to image a plurality of printers provided at different locations with the single portable terminal 400. Accordingly, it can be said that an imaging terminal, in particular, a portable imaging terminal is a device appropriate for providing the support information of the printer 200.

If the support information is stored in the non-volatile storage device 220 of the printer 200 or the non-volatile storage device 420 of the portable terminal 400, there is a possibility that it is difficult to provide sufficient support information from the viewpoint of capacity restriction. In order to update the support information, there is a possibility that a complicated procedure (for example, download of an update file, or the like) may be required or an operation burden imposed on the user with the update may increase. In this illustrative embodiment, since the portable terminal 400 acquires the support information from the server connected through the network (for example, Internet 70), it is possible to easily provide sufficient and latest information to the user.

Even if the server 60 provides sufficient support information as a Web service, there is a possibility that the support information is not sufficiently utilized by the user. For example, a large burden is imposed on the user when locating desired support information out of the support information group 651 including multiple support information. For example, an operation to search desired support information with the links of a plurality of Web pages classified in a plurality of classes is comparatively bothersome. However, according to this illustrative embodiment, if the display state of the display lamps in the captured image represents that the printer is in the first state, the first URL is acquired, and if the display state of the display lamps in the captured image represents that the printer is in the second state, the second URL is acquired. As a result, by imaging the specific region including the plurality of display lamps 11 to 15, the user can easily obtain the support information associated with the state of the printer 200 at imaging.

Since the support information to be provided is displayed based on the display state of the plurality of display lamps 11 to 15, it is not necessary that the printer 200 stores special information (for example, information, such as a URL or a QR code (Registered Trademark)) for specifying the support information to be provided in advance. As a result, in regard to the support information of the already shipped printer 200 having no special information, it is possible to easily provide appropriate support information based on the display state of the display lamps of the printer.

The information providing unit 300 acquires model information (product information) for identifying the type of printer 200, and acquires a URL in accordance with the analysis result of captured image data and the model information representing the type of printer 200. Accordingly, it is possible to display appropriate state related information on the portable terminal 400 in accordance with the type of printer 200. For example, even if the states of the printers are identical, if the models of the printers are different, the support information to be provided may be different. For example, in regard to support information relating to toner empty, the product number of corresponding toner cartridge or the like may differ depending on the model.

The information providing unit 300 can receive the correction of the display state of at least a part of the display lamps specified by analyzing captured image data from the user (Step S50 of FIG. 8, FIG. 9D). If the correction of the display state is received from the user, the display state of the display lamps is finally specified in accordance with the correction result. Accordingly, it is possible to determine the display state of the display lamp with high precision and to display appropriate support information on the portable terminal 400.

If "blinking" is included in the display state of the display lamps, the information providing unit 300 acquires first captured image data and second captured image data imaged at a predetermined time after the first captured image data is imaged. The information providing unit 300 analyzes these captured image data to specify the display state of the display lamps including the blinking state. As a result, it is possible to appropriately specify the display state of the display lamps including "blinking". As shown in the imaging information table DTC of FIG. 6, as the predetermined time (imaging interval), an appropriate time is used depending on the model. That is, if a target printer is a printer of a first type, a first predetermined time is used, and if the target printer is a printer of a second type, a second predetermined time is used. As a result, it is possible to specify the display state of the display lamps with high precision in accordance with the model of the printer. As shown in the imaging information table DTC of FIG. 6, an appropriate number of captured image data set for each model are acquired. As a result, it is possible to suppress an analysis load compared to a case where multiple captured image data, such as a motion image, are acquired and analyzed.

Since the information providing unit 300 executes the captured image correction processing (FIG. 11) to correct the positions of the display lamp in the captured image, it is possible to specify the display state of the display lamps with high precision in the display state specifying processing (FIG. 14). For example, even if the position and size of each of the display lamps in the captured image SI are deviated from the target position and size due to shaking or the like of the user at imaging, it is possible to specify the display state of the display lamps with high precision.

C. Modified Illustrative Embodiment (1) In the information providing processing according to the above-described illustrative embodiment, although the identification information acquiring unit 360 acquires the URL from the URL table DT1 stored in the non-volatile storage device 420 of the portable terminal 400, alternatively, the URL may be acquired from the server 60. Specifically, as indicated by a broken line in FIG. 1, the identification information acquiring unit 360 may include a state information transmission unit 365. In the information providing processing of FIG. 8, Steps S52A to S56A may be executed, instead of Step S55. In Step S52A, the identification information acquiring unit 360 acquires the state of the printer of the target model based on the specified display state of the display lamps and the target model. For example, the identification information acquiring unit 360 refers to the tables (FIG. 4) of the target model in the URL table DT1, and acquires the state of the printer associated with the specified display state of the display lamps. For example, if the table DT1a of FIG. 4 is referred to, and if the specified display state of the plurality of display lamps 11 to 15 shown in FIG. 3 "off", "yellow blinking", "off", "off", and "green lighting", "Residual toner amount: Small" is acquired as the state of the printer. In Step S54A, the state information transmission unit 365 of the identification information acquiring unit 360 transmits state information representing the state of the printer and the model information representing the target model to the server 60. The server 60 replies a URL corresponding to the combination of the received state information and model information to the portable terminal 400. In Step S56A, the identification information acquiring unit 360 acquires (receives) the corresponding URL from the server 60. In this case, in the server 60, even if an administrator of the server updates a Web page which provides support information, and the URL is updated, the portable terminal 400 can acquire the support information without problem. A server which becomes a URL acquisition source may be different from a server which becomes a support information acquisition source.

Figures 16A, 16B:
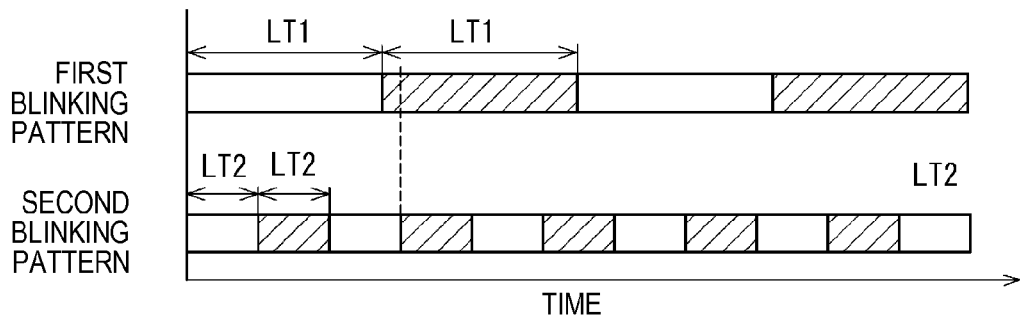
FIGS. 16A and 16B are diagrams illustrating display states of display lamps and imaging conditions according to a modified illustrative embodiment.

(2) In the above-described illustrative embodiment, although the imaging times is one or two, the imaging times other than one or two may be used depending on an allowable display state of the display lamps. FIGS. 16A and 16B are diagrams illustrating a display state of display lamps and imaging conditions according to a modified illustrative embodiment. The display lamps in the modified illustrative embodiment may have a plurality of kinds of display states including a plurality of blinking states, specifically, four kinds of display states of "lighting", "off", "first blinking", and "second blinking". The display state "lighting" and "off" is the same as the display state having the same name in the first illustrative embodiment. The display state "first blinking" is a display state in which a light emission state and a non-light emission state are repeated at a first interval LT1. As shown in FIG. 16A, the display state "second blinking" is a display state in which a light emission state and a non-light emission state are repeated at a second interval LT2. The first interval LT1 is equal to or greater than two times the second interval LT2.

In this case, in order to determine the four kinds of display states, in particular, in order to appropriately determine two kinds of blinking states, the imaging interval is set to the minimum blinking interval, in the example of FIGS. 16A and 16B, the second interval LT2. The imaging times K is set such that the time K times the imaging interval (=the minimum blinking interval) becomes longer than at least the maximum blinking interval, in the example of FIGS. 16A and 16B, the first interval LT1. In the example of FIGS. 16A and 16B, since (LT2×3)>LT1>(LT2×2), the imaging times is set to at least three. FIG. 16B shows a method of determining a final specified result based on a specified result obtained by analyzing three captured images A to C if the imaging interval is set to the second interval LT2 and the imaging times is set to three. It is assumed that the three captured images A to C are imaged in this order (alphabetical order).

Specifically, if all the three captured images A to C are "light emission", the display state of the target display lamp is specified to be "lighting". If all the three captured images A to C are "non-light emission", the display state of the target display lamp is specified to be "off". If the three captured images A to C include both an image to be "light emission" and an image to be "non-light emission", the display state of the target display lamp is specified to be either "first blinking" or "second blinking". That is, if the three captured images A to C are arranged in time series, and if an image to be "light emission" and an image to be "non-light emission" are arranged alternately, the display state of the target display lamp is specified to be "second blinking". If the three captured images A to C are arranged in time series, and if two images to be "light emission" are arranged continuously or if two images to be "non-light emission" are arranged continuously, the display state of the target display lamp is specified to be "first blinking".

In this way, the imaging times may be set to various values equal to or greater than one in accordance with an allowable display state of a display lamp different between respective models. In general, if the target printer is a printer of a first type, N (where N is an integer equal to or greater than one) pieces of captured image data may be acquired, the display state of the display lamps in the capture image may be specified by the analysis of the N pieces of captured image data. If the target printer is a printer of a second type, M (where M is an integer larger than N) pieces of captured image data may be acquired, and the display state of the display lamps in the captured image may be specified by the analysis of the M pieces of captured image data.

(3) In the above-described illustrative embodiment, although a printer is illustrated as a product, alternatively, a different electronic apparatus, for example, a scanner including a print function and a scanner function, a stand-alone scanner, or the like may be used.

(4) In the above-described illustrative embodiment, although the model information (product information) for identifying the model of the printer is acquired based on the input by the user, alternatively, the model information (product information) may be acquired based on the analysis result of captured image data. In this case, for example, the non-volatile storage device 420 of the portable terminal 400 stores histogram data representing the color distribution of the specific region 100 of the model of the printer or data of a frequency component as reference data for each model. The product information acquiring unit 320 creates histogram data of captured image data or data of the frequency component as analysis data. The product information acquiring unit 320 calculates similarity of analysis data and reference data, and acquires model information corresponding to reference data having the highest similarity to analysis data. A method of evaluating similarity of analysis data and reference data is disclosed in, for example, JP-A-2001-167118 (a method of comparing coefficients representing frequency components of images) or JP-A-2008-234327 (a method of comparing histogram data obtained by histogramming chromaticity of images on a chromaticity diagram. In the above-described illustrative embodiment, although the model information (product information) for identifying the model of the printer is acquired when the radio button RB corresponding to a desired model is selected by the user, model information, such as a model number, may be acquired by the input of the user through the buttons of the portable terminal 400.

(5) In the above-described illustrative embodiment, although the portable terminal 400 and the server 60 cooperate to provide the support information to the user, the support information may be provided by the portable terminal 400 alone. In this case, the support information of all items of all target models may be stored in the non-volatile storage device 420 of the portable terminal 400. In this case, it should suffice that the information providing unit 300 of the portable terminal 400 acquires corresponding support information from the non-volatile storage device 420 based on identification information (for example, an error item name or an address in the non-volatile storage device 220) corresponding to the display state of the display lamps specified based on captured image data. The support information may be stored in the non-volatile storage device 220 of the printer 200. In this case, for example, the portable terminal 400 may specify the IP address of the printer, thereby acquiring support information from the printer 200, instead of the server 60.

(6) In the above-described illustrative embodiment, support information, such as a solution to an error, is illustrated as state related information. However, the present invention is not limited thereto, and state related information may be information associated with the normal state of the printer, for example, description of a specific operation method of printing processing or description of each setting item and a specific method of setting a setting item. The state related information is not limited to the form of being displayed on the display unit 470, and the state related information may be output from the portable terminal 400 in another form. For example, a guide voice of an operation method or the like of the printer 200 may be output as the state related information from (on) the portable terminal 400.

(7) The reception of the correction by the user on the specified result of the display state based on the analysis result of captured image data may be omitted. That is, the specified result of the display state based on the analysis result of captured image data may be always used as the final specified result. The acquisition of the model information may be omitted. That is, the information providing unit 300 may be realized by a dedicated application program (for example, an accompanying program of the product) for one model.

(8) In the above described illustrative embodiment, the information (FIG. 5B) of the allowable display state of the respective display lamps recorded in the display state information table DTB is used to create the pull-down menu PM (FIG. 9D) when receiving the correction by the user on the specified result of the display state. Alternatively or additionally, the display state information may be used to analyze captured image data as a different kind of feature information for each mode. For example, if the display state (FIG. 5B) of the display lamps specified by analyzing captured image data is different from the allowable display state represented by the display state information, there is a high possibility that the analysis result is an error. In this case, for example, the information providing unit 300 may request the user to perform imaging again to acquire captured image data again or may notify the user that the specified result is an error and may request the correction by the user. In this way, the feature information for use in analyzing captured image data is not limited to the positional information of the feature points described in the feature point information table DTD, and various kinds of information representing the features of a different display lamp for each model may be used.

(9) Various kinds of information used in the above-described information providing processing, a list of model information displayed in the model selection image AI1 or information recorded in various tables shown in FIGS. 4 to 7 is stored in the non-volatile storage device 420 in advance. In contrast, these kinds of information may be acquired from the server 60 and temporarily stored in the volatile storage device 425 as necessary.

(10) In the above-described illustrative embodiment, a part of the configuration realized by hardware may be substituted with software, and conversely, a part of the configuration realized by software may be substituted with hardware.

(11) If a part or all of the functions of the present invention are realized by software, software (computer program) can be provided in the form stored in a computer-readable recording medium. The "computer-readable recording medium" is not limited to a portable recording medium, such as a memory card or a CD-ROM, and includes an internal storage device in the computer, such as various RAMs or ROMs, or an external storage device connected to the computer, such as a hard disk drive.

While the present invention has been shown and described with reference to certain illustrative embodiments thereof, it will be understood by those skilled in the art that various changes in form and details may be made therein without departing from the spirit and scope of the invention as defined by the appended claims.

What is claimed is:

1. A non-transitory computer-readable storage medium having a computer program stored thereon and readable by a computer for an imaging terminal including an imaging unit, the computer program, when executed by the computer, causing the computer to perform operations comprising:
   generating, by an image sensor of the imaging unit, captured electronic image data generated by imaging a specific region on a target product, wherein generating the image data includes capturing and storing image values for a plurality of digital image pixels, the captured electronic image data including first captured image data and second captured image data, the second captured image data being captured at a predetermined time after the first captured image data is captured, and wherein the specific region includes one or more display lamps representing a state of the target product;

specifying a display state of the one or more display lamps in a captured image represented by the captured electronic image data, by analyzing the captured electronic image data, the display state of the one or more display lamps including a blinking state;

acquiring identification information for identifying state related information according to the specified display state of the one or more display lamps, wherein the state related information is information relating to the state of the target product corresponding to the specified display state of the one or more display lamps;

acquiring the state related information based on the acquired identification information; and displaying, in a display of the imaging unit, the acquired state related information, wherein, when the target product is a product of a first type, the generating of the electronic image data includes capturing the second captured image data at a first predetermined time after the first captured image data is captured, and wherein, when the target product is a product of a second type, the generating of the electronic image data includes capturing the second captured image data at a second predetermined time after the first captured image data is captured, the first predetermined time being different from the second predetermined time, and wherein the imaging terminal further includes an imaging information table including, for each type of target product, a set number of imaging times to capture image data during an imaging interval, and an imaging interval, which is associated with at least one of the first predetermined time or the second predetermined time.

2. A non-transitory computer-readable storage medium having a computer program stored thereon and readable by a computer for an imaging terminal including an imaging unit, the computer program, when executed by the computer, causing the computer to perform operations comprising:

generating, by an image sensor of the imaging unit, captured electronic image data generated by imaging a specific region on a target product, wherein generating the electronic image data includes capturing and storing image values for a plurality of digital image pixels, the electronic image data including first captured image data and second captured image data, the second captured image data being captured at a predetermined time after the first captured image data is captured, and wherein the specific region includes one or more display lamps representing a state of the target product;

specifying a display state of the one or more display lamps in a captured image represented by the captured electronic image data, by analyzing the captured electronic image data, the display state of the one or more display lamps including a blinking state;

acquiring identification information for identifying state related information according to the specified display state of the one or more display lamps, wherein the state related information is information relating to the state of the target product corresponding to the specified display state of the one or more display lamps;

acquiring the state related information based on the acquired identification information; and displaying, in a display of the imaging unit, the acquired state related information, wherein, when the target product is a product of a first type, the generating of the electronic image data includes capturing N (where N is an integer equal to or greater than one) pieces of image data, and the specifying specifies the display state of the one or more display lamps in the captured image by analyzing the N pieces of captured image data, wherein, when the target product is a product of a second type, the generating of the electronic image data includes capturing M (where M is an integer larger than N) pieces of image data, and the specifying specifies the display state of the one or more display lamps in the captured image by analyzing the M pieces of captured image data, and wherein the imaging terminal further includes an imaging information table including, for each type of target product, a set number of imaging times to capture image data during an imaging interval, and an imaging interval, which is a predetermined amount of time associated with at least one of the N pieces of captured image data or the M pieces of captured image data.

3. The non-transitory computer-readable storage medium according to claim 1, wherein the acquiring of the state related information includes acquiring the state related information from a server through a network interface, wherein the server comprises a storage unit including a first storage region, and a second storage region, and wherein the acquiring of the state related information acquires first state related information from the first storage region which is identified based on first identification information, and acquires second state related information from the second storage region which is identified based on second identification information.

4. The non-transitory computer-readable storage medium according to claim 3, wherein the acquiring of the identification information acquires the identification information from a storage unit in the imaging terminal.

5. The non-transitory computer-readable storage medium according to claim 3, wherein the acquiring of the identification information includes transmitting state information corresponding to the specified display state of the one or more display lamps to the server, and wherein the acquiring of the identification information acquires the identification information corresponding to the state information from the server.

6. The non-transitory computer-readable storage medium according to claim 1, wherein the operations further comprise:
acquiring product information for identifying a type of the target product, and wherein the acquiring of the identification information acquires the identification information for identifying the state related information according to the product information and the specified display state of the one or more display lamps.

7. The non-transitory computer-readable storage medium according to claim 1, wherein the generating of the electronic image data includes generating a plurality of captured image data including first captured image data and second captured image data, the second captured image data being captured at a predetermined time after the first captured image data is captured, and wherein the specifying specifies the display state of the one or more display lamps which includes a blinking state by analyzing the plurality of captured image data.

8. The non-transitory computer-readable storage medium according to claim 1,
wherein the operations further comprise:
acquiring feature information representing a feature associated with one or more display lamps which are different between types of the target product, and
wherein the specifying specifies the display state of the one or more display lamps in the captured image by analyzing the captured electronic image data using the feature information.

9. The non-transitory computer-readable storage medium according to claim 8,
wherein the feature information includes positional information representing a position of a feature point in the specific region including the one or more display lamps, and the specifying executes analysis processing including processing for correcting the position of the one or more display lamps in the captured image using the positional information.

10. The non-transitory computer-readable storage medium according to claim 1,
wherein, when the display state of the one or more display lamps in the captured image represents that the target product is in a first state, the acquiring of the identification information acquires the identification information for identifying first state related information, and
wherein, when the display state of the one or more display lamps in the captured image represents that the target product is in a second state, the acquiring of the identification information acquires the identification information for identifying second state related information.

11. The non-transitory computer-readable storage medium according to claim 1,
wherein the identification information includes an uniform resource locator representing a location of a storage region in a server, the storage region storing therein the state related information, and
wherein the state related information is information relating to the state of the target product and stored in the storage region represented by the uniform resource locator.

12. The non-transitory computer-readable storage medium according to claim 1, wherein the acquired identification information includes a network location of the state related information,
wherein acquiring the state related information based on the acquired identification information includes executing an application and retrieving, through a network interface, the state related information from the network location using the application, and
wherein the acquired state related information is displayed in the application.

13. The non-transitory computer-readable storage medium according to claim 12, wherein the network location includes a uniform resource locator (URL) and the application includes a web browser.

14. The non-transitory computer-readable storage medium according to claim 2,
wherein the acquiring of the state related information includes acquiring the state related information from a server through a network interface,
wherein the server comprises a storage unit including a first storage region, and a second storage region, and
wherein the acquiring of the state related information acquires first state related information from the first storage region which is identified based on first identification information, and acquires second state related information from the second storage region which is identified based on second identification information.

15. The non-transitory computer-readable storage medium according to claim 14,
wherein the acquiring of the identification information acquires the identification information from a storage unit in the imaging terminal.

16. The non-transitory computer-readable storage medium according to claim 14,
wherein the acquiring of the identification information includes transmitting state information corresponding to the specified display state of the one or more display lamps to the server, and
wherein the acquiring of the identification information acquires the identification information corresponding to the state information from the server.

17. The non-transitory computer-readable storage medium according to claim 2,
wherein the operations further comprise:
acquiring product information for identifying a type of the target product, and
wherein the acquiring of the identification information acquires the identification information for identifying the state related information according to the product information and the specified display state of the one or more display lamps.

18. The non-transitory computer-readable storage medium according to claim 2,
wherein the generating of the electronic image data includes generating a plurality of captured image data including first captured image data and second captured image data, the second captured image data being captured at a predetermined time after the first captured image data is captured, and
wherein the specifying specifies the display state of the one or more display lamps which includes a blinking state by analyzing the plurality of captured image data.

19. The non-transitory computer-readable storage medium according to claim 2,
wherein the operations further comprise:
acquiring feature information representing a feature associated with one or more display lamps which are different between types of the target product, and
wherein the specifying specifies the display state of the one or more display lamps in the captured image by analyzing the captured electronic image data using the feature information.

20. The non-transitory computer-readable storage medium according to claim 19,
wherein the feature information includes positional information representing a position of a feature point in the specific region including the one or more display lamps, and the specifying executes analysis processing including processing for correcting the position of the one or more display lamps in the captured image using the positional information.

21. The non-transitory computer-readable storage medium according to claim 2,
wherein, when the display state of the one or more display lamps in the captured image represents that the target product is in a first state, the acquiring of the identification information acquires the identification information for identifying first state related information, and wherein, when the display state of the one or more display lamps in the captured image represents that the target product is in a second state, the acquiring of the identification information acquires the identification information for identifying second state related information.

22. The non-transitory computer-readable storage medium according to claim 2, wherein the identification information includes an uniform resource locator representing a location of a storage region in a server, the storage region storing therein the state related information, and wherein the state related information is information relating to the state of the target product and stored in the storage region represented by the uniform resource locator.

23. The non-transitory computer-readable storage medium according to claim 2, wherein the acquired identification information includes a network location of the state related information, wherein acquiring the state related information based on the acquired identification information includes executing an application and retrieving, through a network interface, the state related information from the network location using the application, and wherein the acquired state related information is displayed in the application.

24. The non-transitory computer-readable storage medium according to claim 23, wherein the network location includes a uniform resource locator (URL) and the application includes a web browser.

* * * * *